United States Patent
Franke et al.

(10) Patent No.: US 9,983,803 B2
(45) Date of Patent: *May 29, 2018

(54) SHIFTING WEAROUT OF STORAGE DISKS

(71) Applicant: INTERNATIONAL BUSINESS MACHINES CORPORATION, Armonk, NY (US)

(72) Inventors: Jeffery M. Franke, Apex, NC (US); James A. O'Connor, Ulster Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/069,289

(22) Filed: Mar. 14, 2016

(65) Prior Publication Data
US 2017/0115902 A1 Apr. 27, 2017

Related U.S. Application Data

(63) Continuation of application No. 14/920,158, filed on Oct. 22, 2015.

(51) Int. Cl.
*G06F 12/00* (2006.01)
*G06F 3/06* (2006.01)
*G06F 13/42* (2006.01)

(52) U.S. Cl.
CPC ............ *G06F 3/0616* (2013.01); *G06F 3/065* (2013.01); *G06F 3/0629* (2013.01);
(Continued)

(58) Field of Classification Search
CPC ...... G06F 3/0616; G06F 3/0629; G06F 3/065; G06F 3/0688; G06F 3/0689; G06F 13/4282; G06F 2213/0024
See application file for complete search history.

(56) References Cited

U.S. PATENT DOCUMENTS

| | | | |
|---|---|---|---|
| 2010/0238574 A1* | 9/2010 | Balasubramanian . | G06F 3/0625 360/15 |
| 2013/0046945 A1* | 2/2013 | Abe ...................... | G06F 3/0611 711/162 |
| 2016/0292025 A1* | 10/2016 | Gupta ................... | G06F 11/076 |

OTHER PUBLICATIONS

Franke et al., "Shifting Wearout of Storage Disks", U.S. Appl. No. 14/920,158, filed Oct. 22, 2015.
(Continued)

*Primary Examiner* — Charles Rones
*Assistant Examiner* — Nanci N Wong
(74) *Attorney, Agent, or Firm* — Cantor Colburn LLP; Steven Chiu

(57) ABSTRACT

Technical solutions are described for shifting wearout of an array of storage disks in a storage system. In an aspect, a method includes staggering completion of maximum number of writes for each storage disk in the array. The method also includes copying data from a storage disk in the array to a replacement disk and redirecting a request to access the data from the storage disk to the replacement disk. The method also includes, in response to passage of a predetermined duration of time since copying the data from the storage disk to the replacement disk, copying the data from the replacement disk to the storage disk and directing the request to access the data from the storage disk back to the storage disk.

7 Claims, 19 Drawing Sheets

(52) U.S. Cl.
CPC .......... *G06F 3/0688* (2013.01); *G06F 3/0689* (2013.01); *G06F 13/4282* (2013.01); *G06F 2213/0024* (2013.01)

(56) References Cited

OTHER PUBLICATIONS

List of IBM Patents or Patent Applications Treated as Related; (Appendix P), Filed Jun. 27, 2016; 2 pages.
Franke et al., "Shifting Wearout of Storage Disks", U.S. Appl. No. 15/069,025, filed Mar. 14, 2016.
Franke et al., "Shifting Wearout of Storage Disks", U.S. Appl. No. 15/069,393, filed Mar. 14, 2016.
Jeffery M. Franke et al., "Shifting Wearout of Storage Disks", U.S. Appl. No. 14/920,129, filed Oct. 22, 2015.
Jeffery M. Franke et al., "Shifting Wearout of Storage Disks", U.S. Appl. No. 14/920,191, filed Oct. 22, 2015.
List of IBM Patents or Patent Applications Treated as Related; (Appendix P), Filed Oct. 23, 2017; 2 pages.
Jeffery M. Franke et al., "Shifting Wearout of Storage Disks", U.S. Appl. No. 15/872,152, filed Jan. 16, 2018.
List of IBM Patents or Patent Applications Treated as Related; (Appendix P), Filed Jan. 18, 2018; 2 pages.
Jeffery M. Franke et al., "Shifting Wearout of Storage Disks", U.S. Appl. No. 15/808,190, filed Nov. 9, 2017.
List of IBM Patents or Patent Applications Treated as Related; (Appendix P), Filed Nov. 9, 2017; 2 pages.

* cited by examiner

Staggering Parity Across Storage Disks to Vary Wearout

| N | Months before MTTF | weeks from t=0 | bandwidth MB/s | Write Ratio to Max for normal MTTF | Relative write to 1000 max | Divided by 9 (for 9 to 1 parity to data write ratio) | PARITY Actual Relative writes 9 to 1 parity to data | DATA 9 to 1 parity to data |
|---|---|---|---|---|---|---|---|---|
| 1 | -36 | 224 | 188.97 | 1.161 | 1161 | 129 | 1161 | 129 |
| 2 | -28 | 232 | 182.46 | 1.121 | 1121 | 125 | 1125 | 125 |
| 3 | -20 | 240 | 176.38 | 1.083 | 1084 | 120 | 1080 | 121 |
| 4 | -12 | 248 | 170.69 | 1.048 | 1049 | 117 | 1053 | 117 |
| 5 | -4 | 256 | 165.35 | 1.016 | 1016 | 113 | 1017 | 113 |
| 6 | 4 | 264 | 160.34 | 0.985 | 985 | 109 | 981 | 110 |
| 7 | 12 | 272 | 155.63 | 0.956 | 956 | 106 | 954 | 107 |
| 8 | 20 | 280 | 151.18 | 0.929 | 929 | 103 | 927 | 104 |
| 9 | 28 | 288 | 146.98 | 0.903 | 903 | 100 | 900 | 101 |
| 10 | 36 | 296 | 143.01 | 0.878 | 879 | 98 | 882 | 98 |
| TOTAL | | | | | 10083 | 1120 | 10080 | 1125 |
| MTTF | 0 | 260 | 162.81 | 1.00 | 1000 | 112  | | |

MTTF = u = 260 weeks (5 device years)
σ = 4 weeks
Max Weeks to Stagger = [ -2 σ x (10/2) ] – 4 = - 36 weeks

SHIFTING WEAROUT OF STORAGE DISKS

DOMESTIC PRIORITY

This application is a continuation of U.S. Non-Provisional application Ser. No. 14/920,158, entitled "SHIFTING WEAROUT OF STORAGE DISKS", filed Oct. 22, 2015, which is incorporated herein by reference in its entirety.

BACKGROUND

The present application relates to storage systems, and more specifically, to storage systems that include multiple storage disks.

Storage systems include multiple disks arranged in an array, such as using Redundant Array of Independent Disks (RAID) techniques. Typically, such arrangements are effective for Hard-Disk Drive (HDD) data protection because the probability of encountering a secondary fault during repair of a first failed device is extremely low. Even though at first glance one might assume that a Solid State Drive (SSD) will have similar failure characteristics as of an HDD, that is not the case. Attempting to apply RAID techniques to SSDs can prove ineffective since SSD failure more often occurs from wearout and not due to normal random failure mechanisms. Further, SSD wearout failures typically occur in a very small time window, which may cause all the SSD devices in the RAID array to fail at about the same time.

SUMMARY

According to an embodiment, a method for shifting wearout of storage disks in an array of storage disks in a storage system includes staggering, by a controller of the storage system, completion of maximum number of writes for each storage disk in the array. The method also includes copying, by the controller, data from a storage disk in the array to a replacement disk. The method also includes redirecting, by the controller, a request to access the data from the storage disk to the replacement disk. The method also includes in response to passage of a predetermined duration of time since copying the data from the storage disk to the replacement disk, copying, by the controller, the data from the replacement disk to the storage disk and directing the request to access the data from the storage disk back to the storage disk.

According to another embodiment, a storage system includes a plurality of storage disks in an array, and a controller that where the controller staggers completion of maximum number of writes for each storage disk in the array. The controller copies data from a storage disk in the array to a replacement disk. The controller also redirects a request to access the data from the storage disk to the replacement disk. Further, in response to passage of a predetermined duration of time since the data is copied from the storage disk to the replacement disk, the controller also copies the data from the replacement disk to the storage disk. The controller also directs the request to access the data from the storage disk back to the storage disk.

According to another embodiment, a computer program product for staggering wearout of storage disks arranged in an array, includes a computer readable storage medium having program instructions embodied therewith. The program instructions executable by a processor cause the processor to copy data from a storage disk in the array to a replacement disk. The program instructions further cause the processor to redirect a request to access the data from the storage disk to the replacement disk. The program instructions further cause the processor to, in response to passage of a predetermined duration of time since the data is copied from the storage disk to the replacement disk, copy the data from the replacement disk to the storage disk, and direct the request to access the data from the storage disk back to the storage disk.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for improving reliability of a storage system by staggering wearouts of storage disks that the storage system uses. The technical solutions facilitate the storage system to use storage disks that are susceptible to wearout failures, such as Flash-based storage disks, by reducing probability of a data loss. For example, the storage system staggers the wearout such that while replacing a first storage disk that may have failed, a probability of a second storage disk failing during the replacement period is reduced.

Reliability Engineering is the art and branch of science concerned with predicting the reliability of devices and systems and with the development of new designs to make them more reliable. This includes techniques to enable systems and devices to remain operational in the presence of a component failure. Common terminology includes:

Time to Failure=T
Failure Rate=F(t)=P (T<t) (CDF—Cumulative Failure Rate)
Reliability=R(t)=P (T>t)=1−F(t)
Hazard Rate=h(t)=P (T<t+dt|T>t) (Conditional Probability of Failure, where dt is an incremental change in t)
MTTF=Mean Time To Failure
MTBF=Mean Time Between Failure (Used to Model with Repair)

Figure 1:
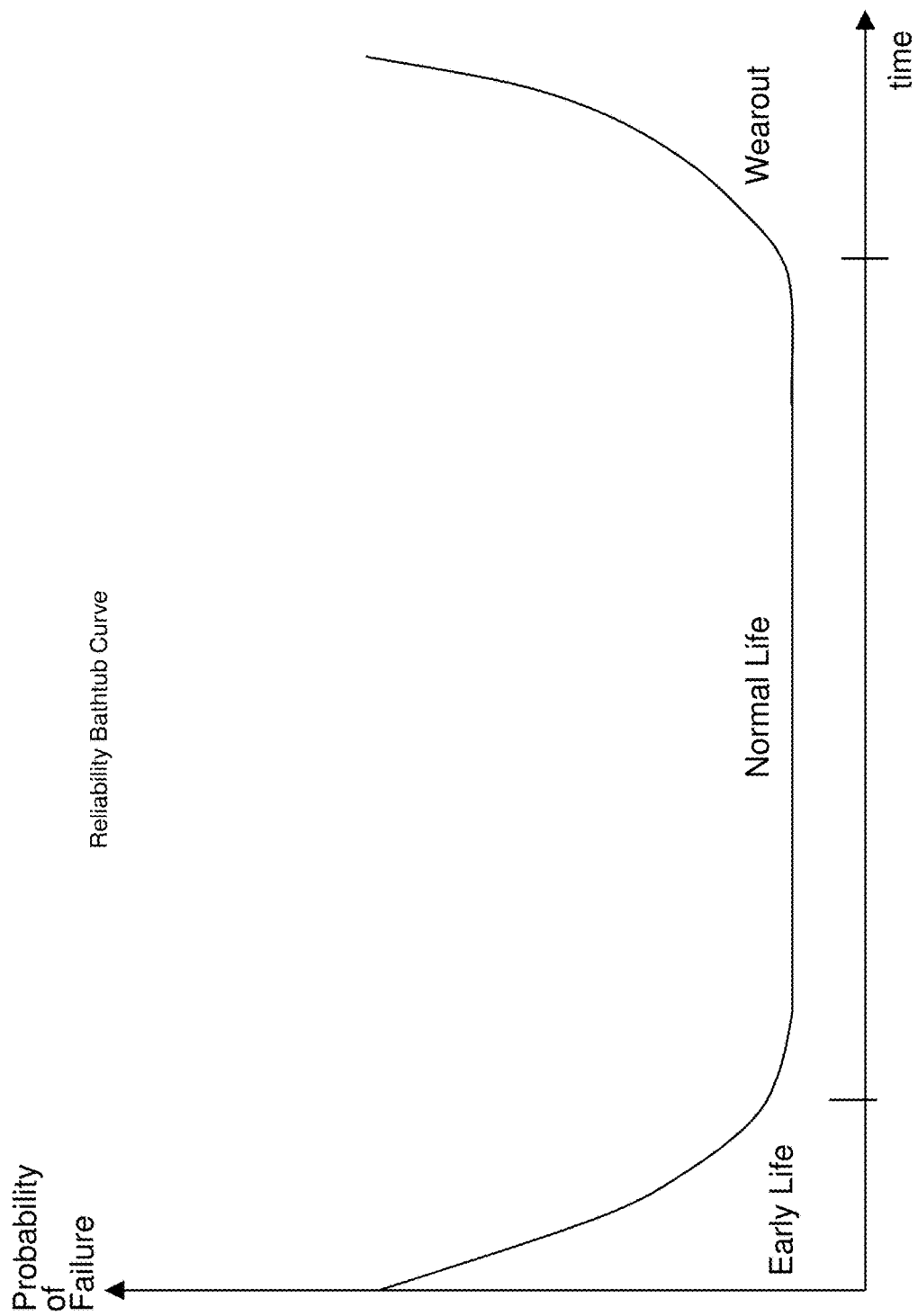
FIG. 1 illustrates failure modes that fall into the different categories depicted by the bathtub curve.

Reliability Engineering recognizes three common failure modes that fall into the different categories depicted by the bathtub curve in FIG. 1. The first failure mode encountered during the life of a system or device is known as "early life" failure, which typically occurs in the first few months after the device is placed into use. Early life failures exhibit a high initial hazard rate that decreases over time, eventually disappearing all together. Early life failures result primarily from manufacturing process-induced defects. Manufacturing processes that produce sophisticated devices such as computer system rely on complex steps and procedures that are regulated. Despite rigorous control such as pressurized clean rooms, high purity chemicals, highly calibrated equipment, well trained operators, some imperfections and deviation from specification are observed in a subset of the devices produced. These manufacturing induced defects and flaws do not always result in devices that do not work. Rather, such defect manifest themselves in ways where a device initially appears to operate properly, but fails after a first few operations or where operational tolerance drifts causing intermittent system failure. Temperature cycling and mechanical vibration can be catalysts cause early life failures to surface and even accelerate the time to failure. Early life failures are often modeled with a Weibull failure rate distribution with a Beta less than 1.

The second and more prevalent failure mode is known as "useful life" failures. These are random failures that occur at a constant hazard rate for most of the useful life of the device. The useful life failure mode follows an exponential distribution, which is a special case of the Weibull distribution where Beta=1. The exponential failure rate has no memory since the hazard rate, the conditional probability of failure in the next delta t time period remains constant throughout the useful life of the device.

The third failure mode is known as "wearout," which has an increasing hazard rate and is a common failure mode for moving mechanical parts subject to friction and wear. For example, electrical devices are retired, or replaced with newer devices, before they wearout. Wearout is a recognized failure mode for devices such as incandescent light bulbs, windshield wipers or car tires where the failure rate abruptly increases after some period of use. Car tires, for example, are more likely to fail after a certain number of miles of driving. As the tread begins to wear, the tires become more susceptible to failure, such as puncture. Wearout has an increasing failure rate and can be modeled with a Weibull distribution where Beta is greater than 1, or with a Normal Failure Rate Distribution.

Storage disks, such as Hard Disk Drives (HDDs), Solid State Drives (SDDs), Flash memory, or any other type of storage disks, are complex electro-mechanical devices that can exhibit wearout. Typically, a storage disk exhibits a long period of useful life before encountering wearout. For example, most HDD failures occur during the useful life, the failures follow an exponential failure rate and have a Mean Time To Failure (MTTF) that is relatively high. Clusters of HDD failure occurring in a short time window are unlikely unless there is some type of systemic problem with the devices.

For example assume a population of high quality, well-built HDDs with a constant hazard rate=0.005. Ignoring the brief early life failure period and assuming that the HDD is retired before it reaches wearout, the reliability of this population can be modeled with an exponential distribution. The MTTF is the inverse of the constant hazard rate of 0.005 which is 200 years or 200 device-years when measuring a population of HDDs. That is, with a population of exactly 200 HDDs run continuously for 1 year, one would expect on average a single (1) HDD to fail during that time. For 400 HDDs it would be 2 failures.

Nevertheless, even with a relatively low failure rate of HDDs, the implications of a single device becoming non-functional is catastrophic since the data on the device is lost when it fails. With large system environments, running thousands if not tens of thousands of drives, failures are more common, as evinced by calculations described earlier. Accordingly, for example, if a population of 1000 HDDs is run for a year, on average 5 HDD failures are expected, and for 10,000 HDDs 50 HDD failures are expected. Thus, with a MTTF of 200 device-years for a large population of HDDs, device failure is estimated to be relative common.

Figure 2:
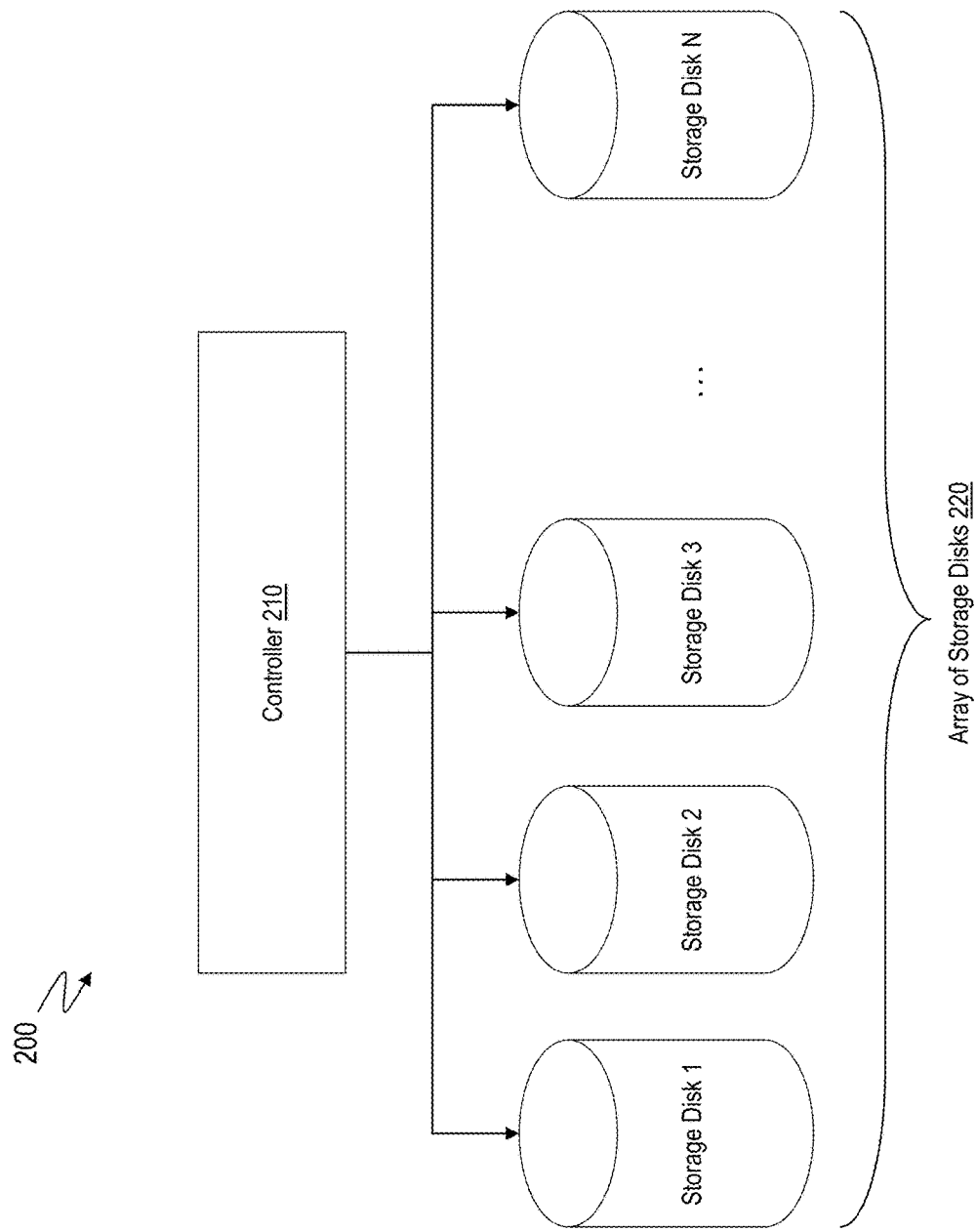
FIG. 2 illustrates an example storage system in accordance with an embodiment.

Hence, storage systems, such as a storage system 200 illustrated in FIG. 2 uses several storage disks to store data. The storage system 200 includes a controller 210 that stores the data across the storage disks. The storage disks are in an array of storage disks 220.

The controller 210 is hardware that uses software such as firmware and drivers to implement a scheme to store the data across the array of storage disks 220. The controller 210 may be a processor. The controller 210 may be a Serial Advanced Technology Attachment (SATA) or a Parallel Advanced Technology Attachment (PATA) controller that implements the RAID scheme. Alternatively or in addition, the controller 210 may communicate with the array of storage disks 220 via a bus, such as an interface or a connector. The bus may be a SATA connector, a PATA connector, a Peripheral Component Interconnect (PCI) Express connector, a Small Computer System Interface (SCSI) connector, a M.2 connector, or any other type of interface to transfer data back and forth to and from the array of storage disks 220.

The array of the storage disks 220 includes one or more non-volatile storage disks that store computer readable data. The array of storage disks 220 may include any number of storage disks, such as one, two, three, five, six, and so on. A storage disk in the array may be a HDD, a SDD, a Flash memory, or any other type of non-volatile memory. The array of storage disks 220 may include a combination of storage disks of the above type. The array of storage disks 220 store symbols or elements. A symbol or an element is a fundamental unit of data or checksum. For HDDs, symbols are typically held in sets of sequential sectors. An element is composed of a fixed number of bytes. It is also common to define elements as a fixed number of blocks. A block thus, represents a fixed number of bytes. A stripe is a complete and connected set of data elements and checksum elements that are dependently related to the checksum computation relations, which is calculated across this dependent set of data elements. In coding theory, the stripe is the code word or code instance. A strip is a segment of the stripe that resides on one physical storage disk. A strip is a collection of contiguous elements on a single storage disk. A strip contains data elements or checksum elements or both, and from the same disk and stripe. The term strip and column may be used interchangeably. In coding theory the strip is associated with the code word and is sometime called the stripe unit. The set of strips in a code word form a stripe. Typically, strips contain the same number of elements. In some cases stripes are grouped together to form a higher level construct known as a stride.

For example, since storage disk failure results in data loss, the controller 210 uses redundancy techniques to prevent, or at least mitigate the data loss. For example, the controller 210 may use techniques, such as checksum, to maintain integrity of the data stored in the storage system 200. In an example, such as RAID-5, the checksum is parity, while in another example, such as RAID-6 the checksum is Reed-Solomn code derived from a complex polynomial. Parity may indicate a count of particular elements in the data, for example a number of '1's in binary data being stored. Reed-Solomon checksum is explained further. For example, the controller 210 may implement a RAID scheme for the array of storage disks 220. In case of a RAID scheme, the storage disks in the array 210 store one or more instances of a RAID erasure code is implemented. The erasure code includes one or more symbols. RAID systems improve performance and/or increase the availability of disk storage systems. Typically, RAID distributes data across several independent storage disks. RAID may be deployed using one of several schemes, each scheme having different characteristics, pros, and cons, associated with the scheme. Performance, availability, and utilization/efficiency (the percentage of the disks that hold data) are some of the metrics used to measure effectiveness of the different RAID schemes. There are, typically, tradeoffs associated with the RAID schemes, because improvements in one attribute results in degradation in another.

For example, RAID-0 includes striping of data across multiple storage disks to improve performance. RAID-1 includes mirroring of data, keeping two exact copies of the data on two different storage disks to improve availability and prevent data loss. The controller 210 may use more than one RAID schemes together to gain combined benefits. For example, RAID-10 includes both data striping and mirroring across the storage disks in the array 220. RAID-10 improves both performance and availability.

The controller 210, in other examples, may implement a RAID-3, RAID-4, or a RAID-5 scheme, which use a single exclusive-or (XOR) check sum to correct for a single data element error. For example, in RAID-3 the controller 210 may use a byte level striping with a dedicated parity storage disk. In RAID-4, the controller 210 uses a block level striping with a dedicated parity storage disk. In RAID-5, the controller 210 uses block level striping like RAID-4, with distributed parity. That is, in RAID-5, there is no dedicated parity storage disk, rather, the controller 210 distributes the parity substantially uniformly across all the disks in the array of storage disks 210. Thus, the controller 210, using RAID-5, reduces a dedicated parity storage disk from being as a performance bottle neck. Using RAID-3, RAID-4, or RAID-5, the controller 210 is capable of correcting a single data element fault when the location of the fault can be pinpointed. The controller 210 may correct for a complete storage disk failure in any of the RAID-3, RAID-4, and RAID-5 schemes.

In another example, the controller 210 implements a RAID-6 scheme. RAID-6 includes block or Byte level striping with dual checksums. RAID-6 facilitates correction of up to 2 data element faults when the faults can be pinpointed. RAID-6 further facilitates pinpointing and correcting a single failure when the location of the failure is not known. RAID-6 is based on Reed-Solomon (RS) error correction codes. RS-codes are non-binary cyclic codes applied to data elements or symbols. For example, in an RS(n, k), k=the number of data symbols, n=the total number of symbols, if m=symbol length in bits, then $0<k<n<2^{(m+1)}$. Further, if c=symbol error correcting capability when the location of the error is not determined, then $n-k=2c$. In other words, the difference in the total number of symbols and the number of data symbols is directly proportional to the data correcting capability of the RS-code. The minimum distance is the number of bit differences between valid code words. RS-code, thus facilitate a largest possible minimum distance for any linear code.

For non-binary codes, the minimum distance analogous to the Hamming distance is given by $d_{min}=n-k-1$. Accordingly, the ability to correct for faults when the fault location is determined independently, measure as e=erasure correcting capability is calculated by $e=d_{min}-1=n-k=2c$. That is, only half as many faults can be corrected when the location of the error is not determined independently. In such cases, using RS-code helps to determine the location and subsequently correct the error. The RS-codes, in general, is a series of simultaneous equations that are used to solve for unknowns. In the case of the storage system 200, the unknowns are either data symbols or the location of the symbols with the fault. RAID-6, for example, uses 2 equations to generate 2 independent checksums, which are applied to each data elements in each row). The RS-checksum equation can be expressed in polynomial form as $Q(x)=d0+d1*x+d2*x^2+ \ldots d(N-1)*x^{(N-1)}$, where Q(x)=Reed-Solomon checksum where x=a; P(x)=Reed-Solomon checksum where x=1; and d0, d1 . . . dN=polynomial coefficients. The equation can be used to solve for a coefficients, to correct a data element or if the location of the fault is unknown it can be used to solve for the power of x to pinpoint the location.

The RAIDS, RAID-4, and RAID-5 simple XOR is a special case of the RAID-6 Reed-Solomon based scheme, of the polynomial sum where x=1 so that the equations then becomes $P(x)=d0+d1+d2+ \ldots d(N-1)$.

Different examples may use different variations of the general equation described herein. A variation of the equation is typically a primitive polynomial, that is the variation is analogous to a prime number where it has no common roots. That ensures the solution always map to unique values in a finite field, such as a Galois field.

For example, consider a storage system 200 using an array 210 that includes ten (10) HDDs, and in which the controller 210 implements recovery techniques to recover failure of a storage disk by accessing data on other storage devices. For example, the storage system 200 uses a RAID-5 scheme over the array of ten disks. In RAID-5, when an HDD failure is encountered the probability of a second HDD device failing in the array 220 during the repair and rebuild time period is very low. If a second failure is encountered, before the repair and rebuild of the first failed drive is completed, data on both HDD devices will be lost.

Again, consider an HDD with a MTTF of 200 years further assuming repair of the first failed disk in the RAID-5 array of 10 disks takes up to 1 week. The repair time may include time to detect the failure, order a replacement disk, receive the replacement disk, schedule the repair, replace the failed device and rebuild the data on the replacement disk. The probability of a second HDD failing of the 9 HDDs in the array that are still functional is 0.00087 (0.087%) which can be calculated by adding the hazard rate of the 8 HDDs together or from $F(t)^8$ since the state of the other 7 HDDs is immaterial to the outcome.

Therefore, on average a second HDD failure will be encountered for every 1000 repair attempts (0.87 is about equal to 1 so a roughly 1 per 1000). Based on these calculations, in an array of 1000 HDDs, over a year, the storage system 200 expects five (5) HDD failures on average, since the probability of encountering a second HDD failure in the arrays with the problem during the 5 repairs is 0.0043 (0.43%).

In another example, if the controller 210 uses the RAID-6 scheme in which three (3) disks need to fail in the array before data loss is encountered, the probability drops to 0.0000046 (0.00046%). Thus, on average, the storage system 200 expects roughly 1 repair attempt and up to 3 disk fails for roughly every 200,000 repair attempts. If the HDD failure rate is higher or the number of HDDs in the population is higher, the probability of data loss increases, but for the range of typical failure rates, even with very large numbers of devices, RAID techniques are highly effective at preventing data loss.

Now consider a case in which, the array of storage disks 220 includes SSDs (instead of HDDs). SSDs have different failure characteristics to HDDs because of which, applying data storage techniques, such as the RAID techniques to SSDs may be ineffective in comparison to HDDs. SSD failures, typically, occur from wearout and not due to normal random failure mechanisms. Further, SSD wearout failures typically occur in a very small window where all the SSD devices in the array fail at about the same time.

Unlike HDDs, wearout of SSDs is typically a consequence of normal use. This is because the maximum number of writes that can be made to an HDD before it exhibits wearout is typically on the order of a thousand trillion or $10^{12}$ writes. With SSDs the number of writes is on the order of a trillion times lower dropping to between hundreds of thousands $10^5$ to thousands $10^3$ depending on whether single level cell (SLC), multilevel cell (MLC), or triple level cell (TLC), NAND flash devices are employed in the SSDs. There is ongoing engineering challenge to optimize characteristics of SSDs by balancing density, performance, and endurance measured in maximum number of writes and data retention time underway. Thus unlike HDDs, random hardware failure of SSDs is typically not the primary failure mode. Device wearout can be prevalent when the maximum allowable media writes are exceeded. High input/output operations per second (TOP) applications, especially those with a high number of writes, are thus, more susceptible to SSD wearout.

Further, SSDs employ sophisticated wear leveling techniques that spread writes evenly across all the NAND Flash devices, and thus prevent the maximum number of writes at any one address of the NAND flash to be exceeded before the others address. This enables the device to be useable for as long as possible. A down side of this technique is that when the SSDs are used in a RAID array it is highly likely the devices will all fail at approximately the same time since between the wear leveling and protection schemes like RAID-5, the storage elements receive about the same number of writes over time.

For example, in the RAID-5 case described earlier, where data loss results when two storage disks fail, using an array of SSDs results in a relatively smaller window of time to replace a failed disk. Just like in case of HDDs, after the first SSD failure the storage system 200 will take a period of time to procure and replace the failed SSD. Once the failed device is replaced a rebuild needs to occur whereby all the data off the remaining devices is read and XORed together to regenerate the data on the replacement device. If a second SSD fails during this period data in the array is lost. Rebuild times for SSDs are typically quicker than HDDs since they typically have less storage and are faster, however typically the rebuild can take the better part of an hour for completion.

Figure 3:
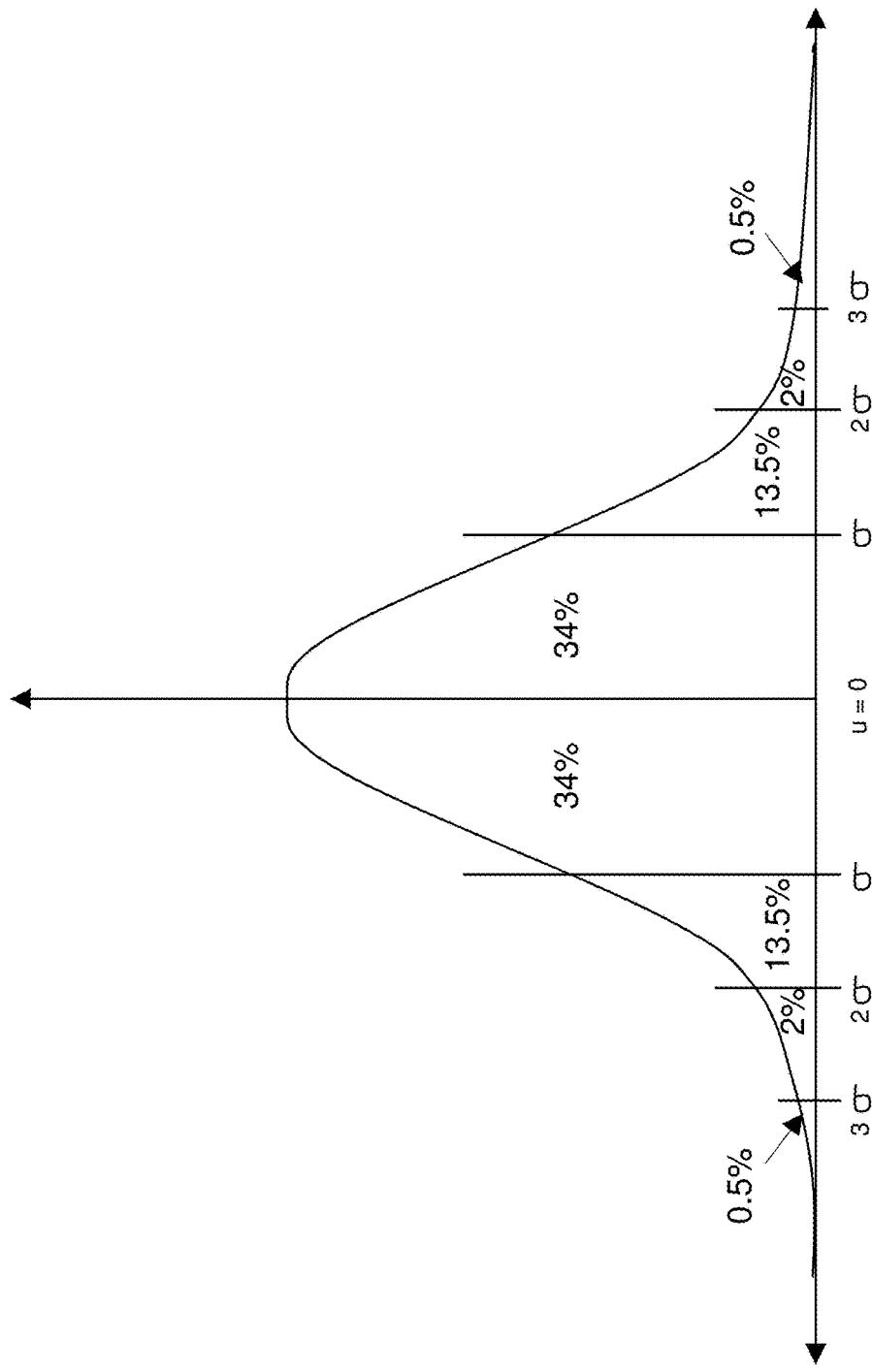
FIG. 3 illustrates a unit normal plot for a normal distribution highlighting the probability of occurrence of a second storage disk failing in conjunction with a first storage disk.
Figure 4:
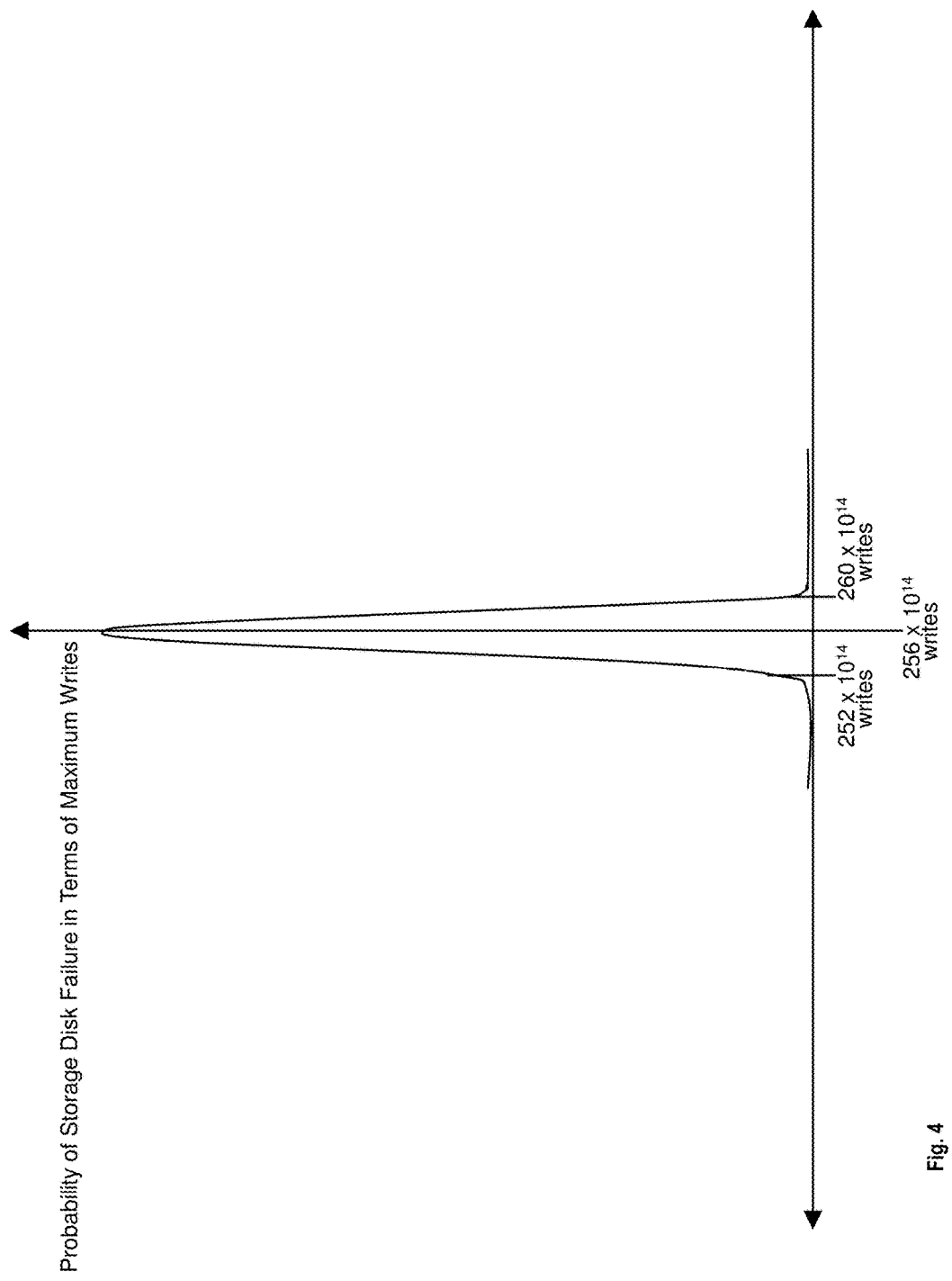
FIG. 4 illustrates an example failure model of a storage disk, according to an embodiment.

A model of a failure of an SSD in the array 210 may be determined and used to improve the storage system 200 to mitigate a possibility of a second storage disk failing while a first storage disk is being replaced. FIG. 3 illustrates a unit normal plot for a normal distribution highlighting the probability of occurrence of the second storage disk failing in this manner. The Figure identifies a first, second, and third order sigma variation around a mean ($\mu$), using a normal distribution for modeling the wearout. The failure model of an SSD uses the mean of the maximum number of writes as is shown in FIG. 4. The reliability of the SSD can be considered as a time to failure problem. For example, assume that the SSD is a 256 GigaByte SSD and that the maximum writes on average per NAND flash device is 100,000. Further, assume that the wear leveling is near perfect then the writes will be spread evenly across all 256 GigaBytes so the total writes (the maximum writes) will be given by $WRITES_{TOTAL}=(256\times10^9)\times(1\times10^5)=256\times10^{14}=2.56\times10^{16}$.

Thus, if the system is writing a 4 kilobyte (KB) block, if the storage system 200 is to have, on average, a MTTF of 5 device-years, the desired IOPs can be calculated as: $IOPS_{WRITE}=(2.56\times10^{16})/(3.16\times10^7 \text{ sec/year})=162$ megabytes (MB)/sec.

In an example, the 5 years may be a desired MTTF for a relatively high average IOPs application environment. In another example, the storage system 200 may be desired to have a MTTF of 6 device-years, or 8 device-years. The MTTF may be a predetermined value that may be used to determine an efficient manner to store the data across the array of storage disks 220, and minimize the possibility of the second storage disk failing while the first storage disk is being replaced.

Figure 5:
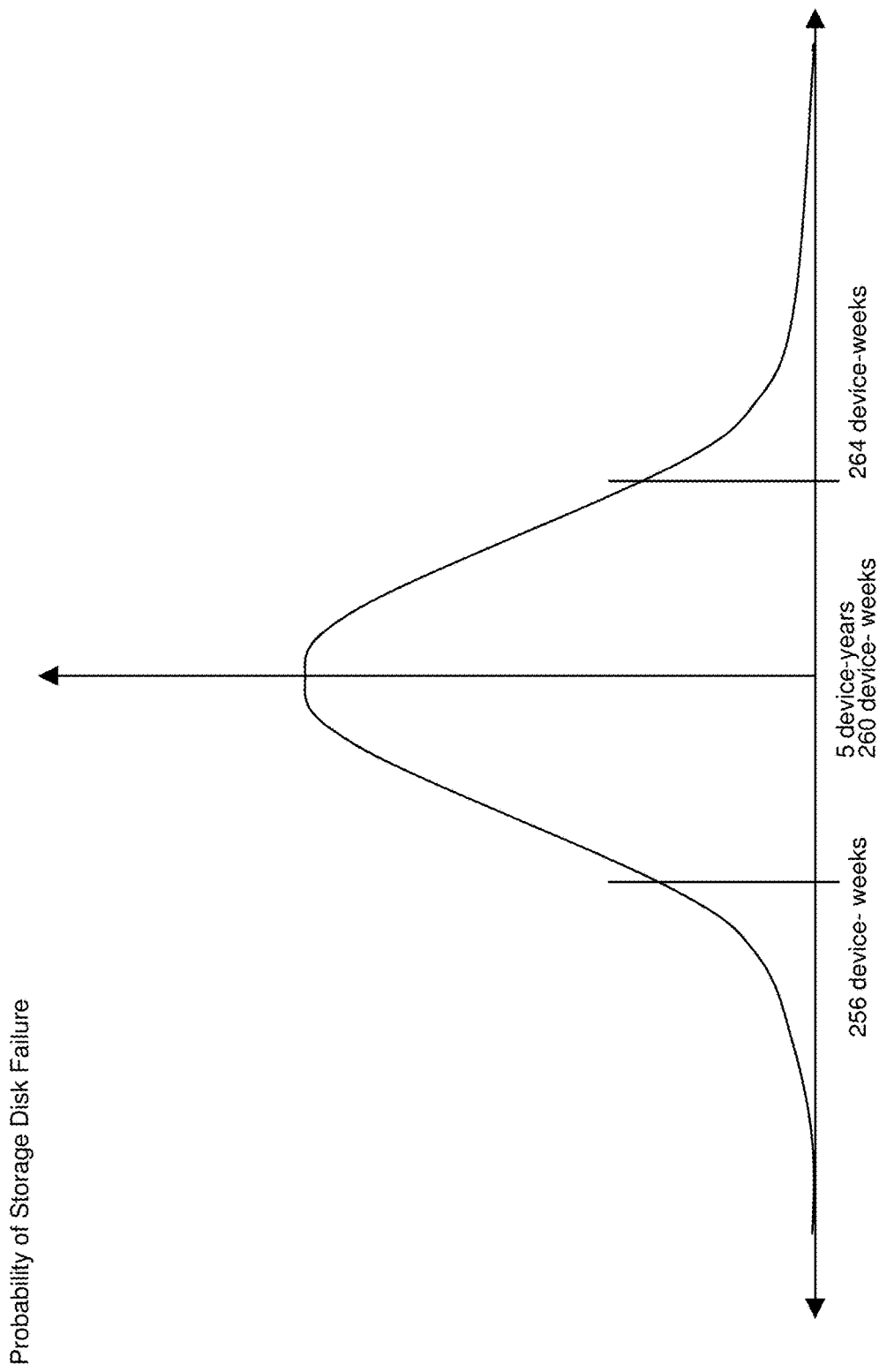
FIG. 5 illustrates example probability of storage disk failure, according to an embodiment.
Figure 6:
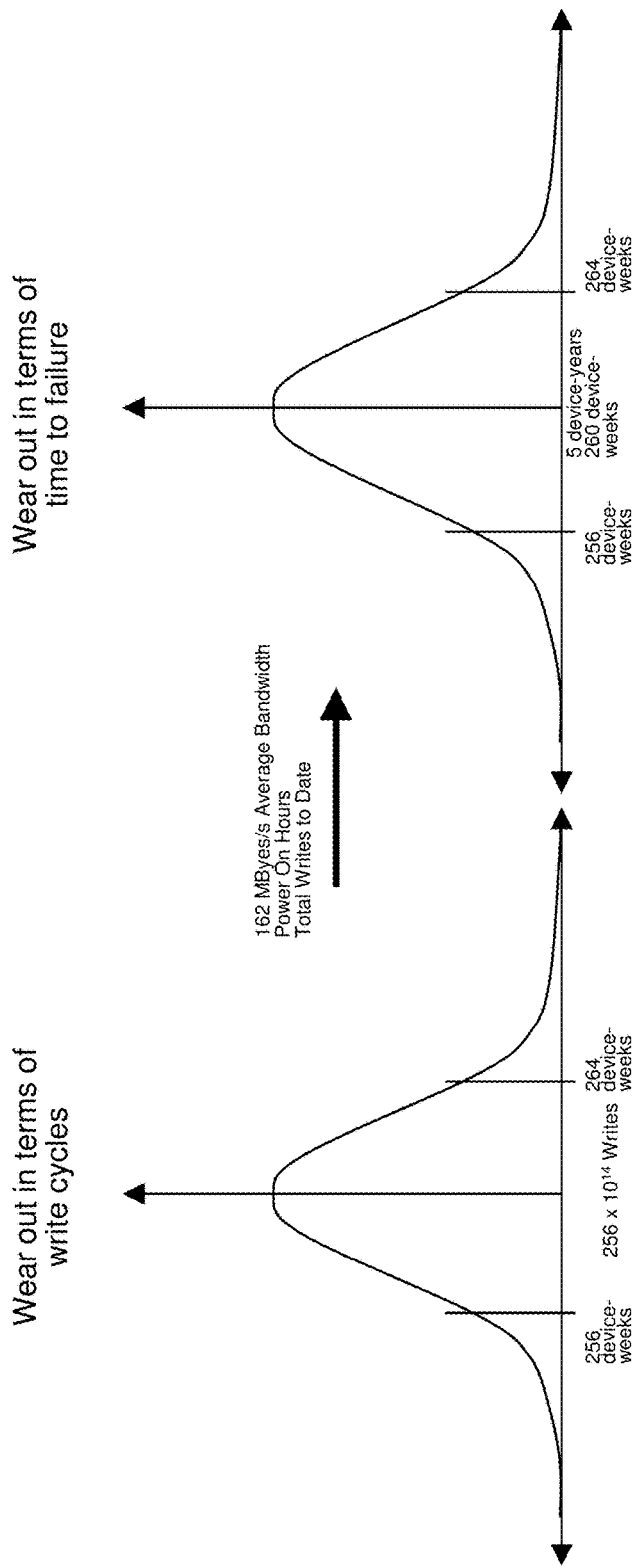
FIG. 6 illustrates example conversion of probability of storage disk failure from number of write to time to failure, according to an embodiment.

However, in the above example of using SSDs in the RAID-5 scheme, the SSDs will all continue to wearout in a relatively small time window so the probability of the second disk failing while the first disk is being replaced is relatively high. For example, FIG. 4 and FIG. 5 illustrate that the maximum writes failure distribution of FIG. 4 can be mapped into a time to failure distribution in FIG. 5. Further, FIG. 6 shows a mapping of one distribution to another.

Returning now to the current example, where the SSD has a MTTF of 5 years and a narrow failure window of, say a first order sigma of 4 weeks on either side of the mean.

Typically, the NAND flash maximum writes occur in a much narrower window than the example. Further, as the IOPs increase, especially for environments with lots of writes, the window narrows even further. For example, the first order sigma may be 1 week on either side of the mean in other examples. Other examples, depending on the number of writes, may have different deviation values.

In the current example, the storage system 200 has an 8 week window where roughly 68% of the SSD wearout failures are predicted to occur. This is an 8 week window centered around a 5 year MTTF. Thus, assuming that the first SSD wearout failure occurs at week 256, and that it takes up to a week to detect the failure, procure a replacement device, schedule the replacement and rebuild the drive, the probability of encountering the second SSD wearout failure in the RAID-5 array before the repair is complete, and thus have a data loss, can be calculated. For example, the probability may be calculated using Markov Models, or Z tables of a normal distribution, or any other technique.

For example, using Z tables for a normal distribution the probability of failure in the next week from $-1$ sigma to $-0.75$ is 0.0679. Thus, the reliability for a single SSD from week 256 to 257 is 0.9321. Since, in this example 9 drives are left in the array, the probability of any 1 of these failing in the next week determines the probability of the second SSD failing while the first SSD is being replaced. Different permutations of device failure may be ignored, since any 1 additional failure or combination of failures results in a data loss. Therefore, calculating the probability that all the SSDs survive and subtracting that from 1 results in $F_{RAID-5}(256<t<257)=1-[R1*R2*R3 \ldots R9]=1-R^9=1-(0.9321)^9=0.469$.

In other words in the example of a 10 device SSD RAID-5 array where a first drive fails early in the wearout period at week 256, the storage system 200 has roughly a 50/50 chance of hitting a second SSD failure and thus having a data loss event if it take up to a week to effect the repair. Since this is the first SSD failure in the 10 SSD array and for the normal distribution assumed in this example the bulk of the other 9 devices are predicted to fail in an 8-week window too. Thus, RAID-5 provides little if any real protection at all against data loss in this scenario. Further, if the first order sigma window is reduced from 8 weeks to 2 weeks it would be far worse than the example described herein.

In another example, consider that the controller 210 implements a RAID-6 scheme for the array of storage disks 220 that includes SSDs. In the RAID-6 scheme, data loss does not occur until three SSDs fail. Utilizing RAID-6 with the same 1 week repair and 8 week±1 sigma window, the probability calculation of a data loss includes estimating the probability of having 2 additional SSD fail during the up to 1 week period to execute the repair. The failure permutations are as follows:

$$F_{RAID-6}(256 < t < 257) = [F1*[1-[R2*R3*R4 \ldots R8]]] +$$
$$[F2*[1-[R1*R3*R4 \ldots R8]]] \ldots +$$
$$[F8*[1-[R1*R3*R4 \ldots R7]]]$$
$$= 8*[F1*[1-[R2*R3*R4 \ldots R8]]]$$
$$= 8*[[1-R1]*[1-[R2*R4*R4 \ldots R8]]]$$
$$= 8*[[1-R]*[1-R7]]$$
$$= 8*[[1-0.9321]*[1-(0.9321)7]]$$
$$= 0.2112.$$

Thus, even with RAID-6, on average one out of every 5 times one attempts to replace a failed SSD, 2 additional drives will wearout before the repair can complete and data loss will occur. Again, since this is probability calculation is for the first SSD replacement for the 10 SSD array and the bulk of the remaining 8 drives will fail in this next 8 week window, the data loss will be a common occurrence even with a more robust RAID-6 protection.

In a more extreme scenario, so as to do everything possible to make RAID work effectively for SSDs, assume that the repair window is no more than a single day (this includes, having a 24×7 coverage of the storage system 200 and stocking replacement SSDs on site so that the system detects and replaces a failed drive). Even in such an extreme scenario, for RAID-5:

$$F_{RAID-5}(256<t<256.035)=1-[R1*R2*R3 \ldots R9]=1-R9=1-(0.9887)9=0.097.$$

Now, on average the storage system 200 encounters a data loss roughly 1 out of every 10 attempts of replacing a storage disk. Thus, since the first of 10 SSD that are expected to wearout during the 8 week period, the possibility of data loss is not acceptable.

In case of RAID-6:

$$F_{RAID-6}(256 < t < 256.035) = [F1*[1-[R2*R3*R4 \ldots R8]]] +$$
$$[F2*[1-[R1*R3*R4 \ldots R8]]] \ldots +$$
$$[F8*[1-[R1*R3*R4 \ldots R7]]]$$
$$= 8*[F1*[1-[R2*R3*R4 \ldots R8]]]$$
$$= 8*[[1-R1]*[1-[R2*R4*R4 \ldots R8]]]$$
$$= 8*[[1-R]*[1-R7]]$$
$$= 8*[[1-0.9887]*[1-(0.9887)7]]$$
$$= 0.0069.$$

In this case, on average 7 of every 1000 repair attempts produces data loss. Nevertheless, if the wearout is quicker, say over a 6 week or 4 week period instead of 8 or if the storage system 200 is unable to replace the failed drive within 1 day the probability of encountering a data loss event quickly increases. Further, repairing a failed disk within 1 day is atypical, and rather ambitious. Hence, if the repair time is extended for any reason the probability of secondary failures again increases.

Thus, the traditional RAID schemes are rendered ineffective in the storage system 200 that uses the array of storage disks 220 that includes storage devices subject to wearout failure (such as SSDs), and where the storage system 200 employs techniques to recover failure of a storage disk by accessing data on other storage devices. For example, the wear leveling technology used on SSDs tends to make the distribution of writes to specific address of the drives irrelevant since wear leveling itself, by design, balances writes equally across all the storage elements (such as across NAND flash used in the SSDs). The most prevalent failure mode for SSDs subject to high numbers of writes, a common usage scenario, is wearout failure as the write limit is reached and thus SSDs when used in RAID arrays will tend to have clusters of device failure at or around the same time. This makes it highly likely to encounter a secondary SSD failure before the first SSD failure can be repaired and data restored to the RAID array, thus resulting in data loss.

The technical solutions described herein utilize different techniques to distribute storage disk failures due to wearout over a longer period of time so that the probability of encountering a second disk failure during the repair of a first is reduced, thus rendering RAID an effective option for protecting data on the storage disks, such as SSDs.

Variation of Checksum Writes

In one embodiment, the technical solutions utilize a RAID structure in which the writes to the storage disks are not equally distributed across all the storage disks in the array 200 (which is a goal of HDD based RAID arrays to optimize performance). RAID-3, for example, with a single parity drive (all parity resides on this one drive), is viewed as deficient compared to RAID-5 for HDDs, since RAID 3 does not spread the parity field evenly across all the drives as is done with RAID-5. The examples described herein distribute parity structure, such as in RAID-5, but not using an equally balanced structure. Instead the distribution of parity field on each device in the array is controlled and different so that the writes to each device over time is different. The number of parity fields on each storage disk is different, spreading them across all the storage disks. Thus, the RMW (Read Modify Write) operations that write data across the storage disks, update (rewrite) the parity when data is written to any storage disk. The storage disk with more parity field (larger size) will experience more writes over time. Thus, by distributing parity differently, the storage system 200 alters the time to wearout for the storage disks. The more parity stored on the storage disk, the sooner that storage disk will wearout. The storage system 200 spreads the parity so that the ±1 sigma distribution of wearout failures does not intersect with the other storage disks. In addition, the technical solutions described herein facilitate using the storage disks longer and avoiding replacing the disks prematurely, rather only when the storage disks have wornout.

The examples of the technical solutions are described using SSDs as storage disks, however, the techniques described are applicable not only SSDs, but to other storage devices, such as flash cards, flash PCI cards, clash SAS Cards, flash DIMMs, and other storage devices subject to wearout failure, and those that employ recovery techniques which require access to data on other storage devices.

Figure 7:
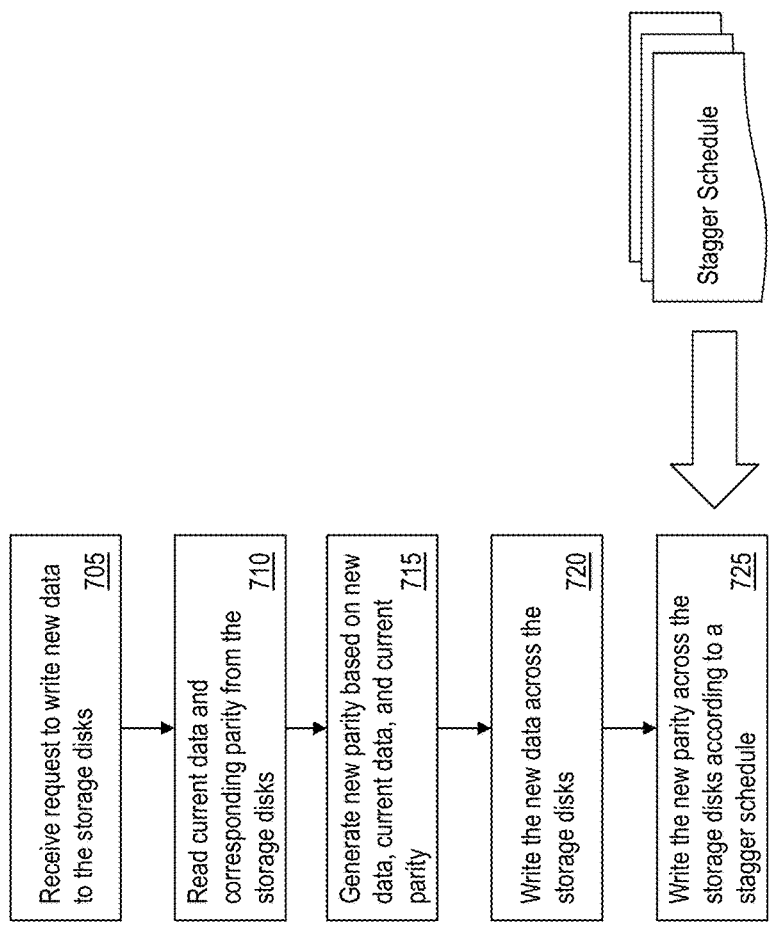
FIG. 7 illustrates a flowchart of example logic to reduce the occurrence of data loss in the storage system in accordance with an embodiment.

FIG. 7 illustrates example logic to reduce the occurrence of data loss in the storage system 200. The controller 210 may implement the logic, for example by executing computer instructions that represent the logic. The controller 210, by implementing the logic, varies a number of parity fields per storage disk in the array 210 so that the wearout periods associated with the respective storage disks in the array 210 are distinct and do not occur at the same time. The controller 210 of the storage system 200 receives a request to write new data to the array of storage disks 220, as shown at block 705. The storage system 200 may use a read modified write (RMW) procedure to write data across the storage disks. For the RMW procedure, the controller 210 reads a current parity and a current data that would be updated with the new data, as shown at block 710. The current parity and current data is stored across the storage disks in the array of storage disks 220. The controller 210 generates new parity corresponding to the new data, such as by an XOR of the current data and parity with the new data, as shown at block 715. The above process may be represented formulaically as below.

Read: $DATA_{current}$ for storage disk to be updated
Read: $PARITY_{current}$
Generate: $PARITY_{new} = DATA_{current} + DATA_{new} + PARITY_{current}$
Write: $DATA_{new}$ for SSD to be Updated
Write: $PARITY_{new}$ The new data and the new parity is then written across the storage disks according to the recovery scheme implemented, as shown by blocks 720 and 725. RMW is more efficient than reading and XORing all the data across all the storage disks, except the one to be updated with the new data to generate the new parity. The RMW operation results in writes to 2 storage disks, one for the new data and one for the new parity written to each storage device. Thus, the RMW operation writes the new parity every time there is new data written to a storage disk in the array 220. Returning to the previous example of a RAID-5 array with 10 SSDs and assuming the writes are predominately RMWs, there is a ratio of 9 to 1 parity writes to data writes. Accordingly, for a SSD with a MTTF of 5 years (260 weeks) following a normal wearout distribution with a first order sigma of 4 weeks, shifting writes on each drive by a multiple of 8 weeks achieves staggering the wearout so that the probability of a second device failing during a repair is acceptable, such as above a predetermined threshold. Accordingly, the controller 210 stores the new parity across the storage disks based on a stagger schedule, as shown at block 725. The stagger schedule indicates, to the controller 210, how to stagger write operations across the storage disks in the array 220. In an example, the stagger schedule indicates how to stagger write operations of the checksum data, such as parity or RS codes, across the storage disks.

Figure 8:
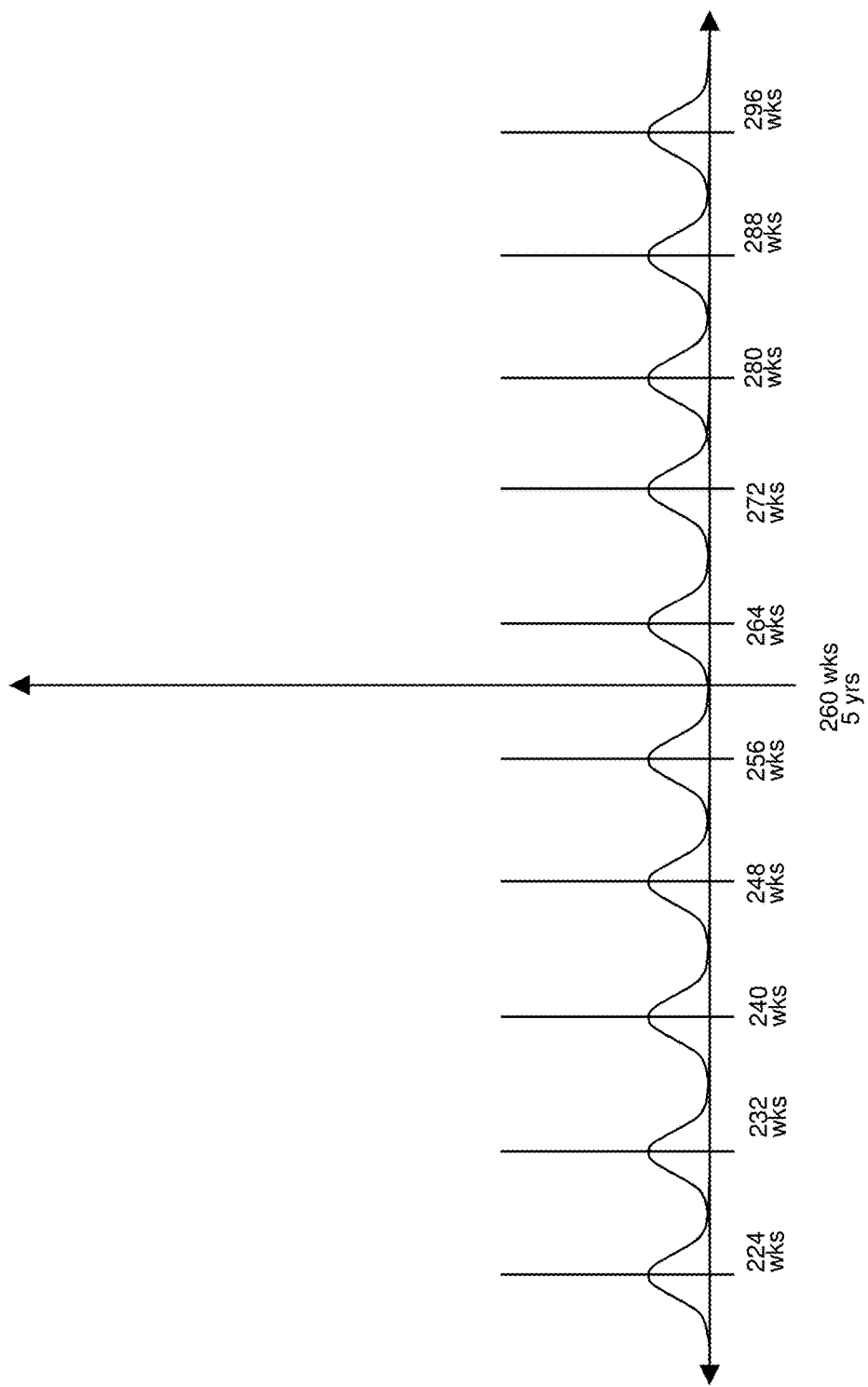
FIG. 8 illustrates an example schedule for staggering checksum across storage disks to vary time to wearout in accordance with an embodiment.

FIG. 8 illustrates how much to stagger the parity fields on the 10 storage disks in the above example to avoid any overlap in the wearout periods for each storage disks. Since there are 10 storage disks and the bulk of the wearout occurs ±1 sigma around a MTTF or 260 weeks moving the storage disk with the highest number of parity fields out to roughly 40 weeks results in a calculation such as below.

For an odd number of disks- $$\text{Weeks prior to Mean} = \frac{N}{2} \times 2\sigma$$
$$= \frac{10}{2} \times 2(4)$$
$$= 40$$

For an even number of disks- $$\text{Weeks prior to Mean} = \left[\frac{N}{2} \times 2\sigma\right] - \sigma$$
$$= \frac{10}{2} \times 2(4) - 4$$
$$= 40 - 4$$
$$= 36$$

Figure 9:
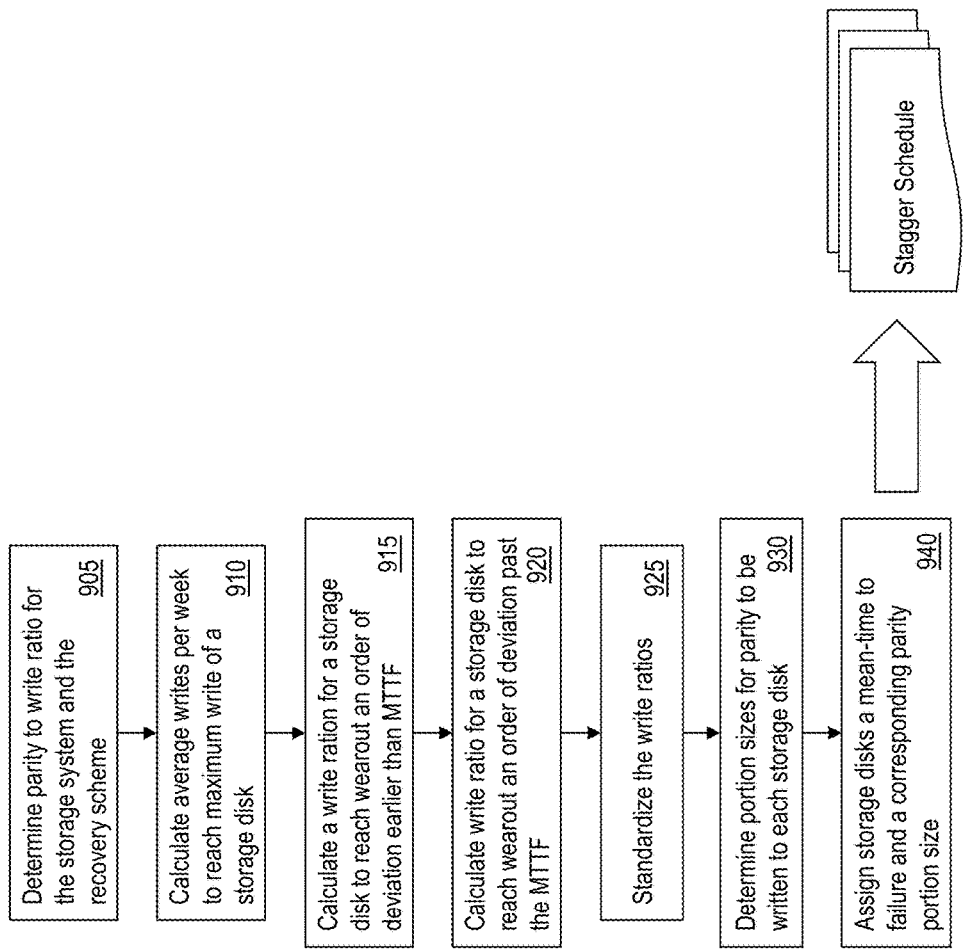
FIG. 9 illustrates a flowchart of example logic to generate a stagger schedule to reduce the occurrence of data loss in the storage system in accordance with an embodiment.
Figure 10:
FIG. 10 illustrates an example schedule for staggering checksum across storage disks to vary wearout in accordance with an embodiment.

Accordingly, the stagger schedule is generated to stagger the writes on the storage disks by staggering the parity fields on each drive. The staggering spreads the time to wearout so that each storage disks wears out at a different time, and prevents any significant overlap between failure time of one storage disk with replacement time of another storage disk. FIG. 9 illustrates example logic to generate the stagger schedule and FIG. 10 illustrates an example stagger schedule generated for the 10 storage disk example being discussed herein. In an example, the controller 210 generates the stagger schedule. Alternatively, the controller 210 receives the stagger schedule and uses the stagger schedule.

The generation of the stagger schedule includes determining a write ratio of the parity to data according to the number of storage disks in the storage system 200 as well as the recovery scheme being implemented, as shown at block 905. In the example storage system with 10 storage disks with a RAID-5 scheme, there is a 9 to 1 write ratio of parity to data with the RMW updates. The stagger schedule is based on a value of an average writes per week to reach the write maximum for the storage disks in the system, which is calculated, as shown at block 910. In the example, to get to the $2.56 \times 10^{16}$ write maximum, the calculation results in $9.84 \times 10^{13}$ average writes per week. In other words, the week 260, the normal MTTF, is used as the center point to adjust the writes across the storage disks. That is the stagger schedule is initialized according to a 1.0 (260/260) ratio of weeks to wearout, and then the writes for each storage disk are calculated and adjusted. An amount of additional writes for a first storage disk to reach the wearout an order of deviation earlier than MTTF is calculated, as shown at block 915. Thus, in the example in order to reach the maximum writes 36 weeks early or at 224 weeks (260-36) from time zero a first storage disk takes 1.16 (260/224) more writes per week on average. Although the example uses a first order deviation, a second, or a third order deviation may be used in other examples. So that a storage disk does not fail while another storage disk is being replaced upon failure, the wearout of the storage disks are spread from the first order deviation before the MTTF and the first order deviation past the MTTF. Therefore, the wearout of a final storage disk is delayed until the first order deviation past the MTTF, as shown at block 920. In the ongoing example, the first order deviation 36 weeks past the MTTF 260 is week 296. Accordingly, the controller 210 reduces a ratio of writes for a tenth storage disk in the array by 260/296 or 0.878 writes. Write ratios for each of the storage disk in the array 220 is calculated in this manner.

Column 5 in FIG. 10 illustrates the adjustment ratio for all the storage disks in the array 220 of the example. The write ratios thus calculated are standardized, as shown at block 925. For example, the write ratios may be standardized per 1000. Column 6 illustrates the relative number of writes relative 1000 write for a normalized storage disk with the standard MTTF of 260 weeks per the example. Using the standardized write ratios, a size of parity portions for each storage disk is determined, as shown at block 930. Since, in the example, the parity write to data ratio is 9 to 1, by dividing the total writes per 1000 in Column 6 by 9 and rounding to the nearest whole number, the relative number of parity fields on each storage disk is calculated. Results for the example are illustrated in column 7. The relative number of parity fields on each storage disk indicate a size of a portion (i.e. portion size) of the parity data to be written to each storage disk in order to produce the write differences in column 6. The calculations may be rounded to produce integers. For example, since dividing by 9 does not always produce integers the results may be round which may deviate the write ratio by a negligible amount, that does not produce any significant difference in the mean-time to wearout skew, as can be seen by calculated the actual writes difference in Column 8. FIG. 10 identifies the values of MTTF, and σ used to determine the write ratios and the corresponding parity portion sizes for the 10 storage disk array in the example. Other examples may use different MTTF and/or σ values to stagger the parity portions, and consequently the writes to the storage disks differently.

The controller 210 assigns the storage disks in the array 220 a portion size of the parity according to the corresponding MTTFs based on the stagger schedule generated, which is used to write a variable size of the parity in each of storage disks, as shown at block 725. For example, a first storage disk in the array 220, that has the shorted estimated mean time to wearout gets the greatest number of parity fields. In an example, if the storage disks in the array 220 are all at a similar stage relative to their wearout, such as the storage disks were installed at the same time, the storage disks are assigned a MTTF and subsequently, a corresponding parity portion size is assigned to each respective storage disk. In the ongoing example the first storage disk with the shortest MTTF has a write ratio of 129 to 98 parity fields as compared to the storage disk with the longest estimated MTTF. The 129 is only about 30% higher writes than the 98 which is fairly negligible.

Thus, using the stagger schedule, the controller distributes the wearout of the storage disks over a ±36 week period centered around the MTTF of 260 weeks. Further, the stagger schedule facilitates that storage disks in the storage system 200 are not replaced prematurely, but only when the write limit of each storage disk has been reached.

In yet another embodiment, the storage system 200 employs a RAID-6 or a RAID-6 like recovery scheme, where two or more parity or checksum fields are utilized. The number of writes to each storage disk is made different for each device by changing the number of parity or checksum fields on each device using logic similar to the example logic described herein in context of the RAID-5 or RAID-5 like recovery scheme. As can be understood by a person skilled in the art, in the embodiments described herein, tracking which stripes have the parity fields on which devices can be chosen in several different ways without affecting the results of the technical solutions described. In an example, the stripes are chosen by allocating a specific block of addresses to each storage disk. In another example, to gain additional granularity, the controller 210 may assign a flag for each strip specifying which storage device contained parity.

The technical solutions described herein, thus facilitate a storage system to prevent data loss for multiple storage devices that tend to all fail at about the same time by reducing the probability of encountering a secondary storage device failure (and hence the data loss) before a first failed storage device can be replaced and reintegrated back into the RAID array. The multiple storage devices tend to fail at the same type since the storage devices fail due to a wearout type failure after a predetermined number of maximum writes to the storage devices. The technical solutions may be used irrespective of a recovery scheme being used by the storage system, such as RAID-5, RAID-6, or any other recovery scheme. The technical solutions reduce the probability of the data loss by generating and/or using a stagger schedule. The stagger schedule is based on the maximum number of writes to the storage device, which is a predetermined value. The maximum writes maybe a known value or an estimated. Further, the schedule is based on a predetermined MTTF of the storage devices, which may be known or estimated. The stagger schedule varies a time to failure of the storage disks by controlling write operations to each storage disk consequently spreading the time to failure of the storage disks over time. The time to failure is varied across the storage disks in the array by varying the number of parity fields vs. data fields on each storage disk in the data stripe. Thus, the number of writes over time is different for each storage device and hence the wearout time of each storage device will be different and be spread over time.

Spare Disk

In a second embodiment, the technical solutions use an additional storage disk to distribute the storage disk failures due to wearout over a longer period of time so that the probability of encountering a secondary failure during the repair of a past error is reduced. The technical solutions using the additional storage disk thus, render recovery schemes, such as RAID an effective option for protecting data on Flash-based storage disks that are susceptible to wearout failures.

For example, a spare storage disk is added to the array of storage disks. The spare storage disk temporarily replaces each drive in the array with the spare for specific periods of time so that the wearout time for each storage disk is varied. The performance overhead associated with copying data from a storage disk to the spare storage disk, using the spare for the specific period of time, and then copying the data back to the original storage disk, is overcome by performing such operations at a lower priority tasks that do not impact overall system performance. Further, the controller 210 avoids the performance overhead by initiating the operations at least prior to a predetermined time from an estimated wearout of a storage disk in the array 220.

Figure 11:
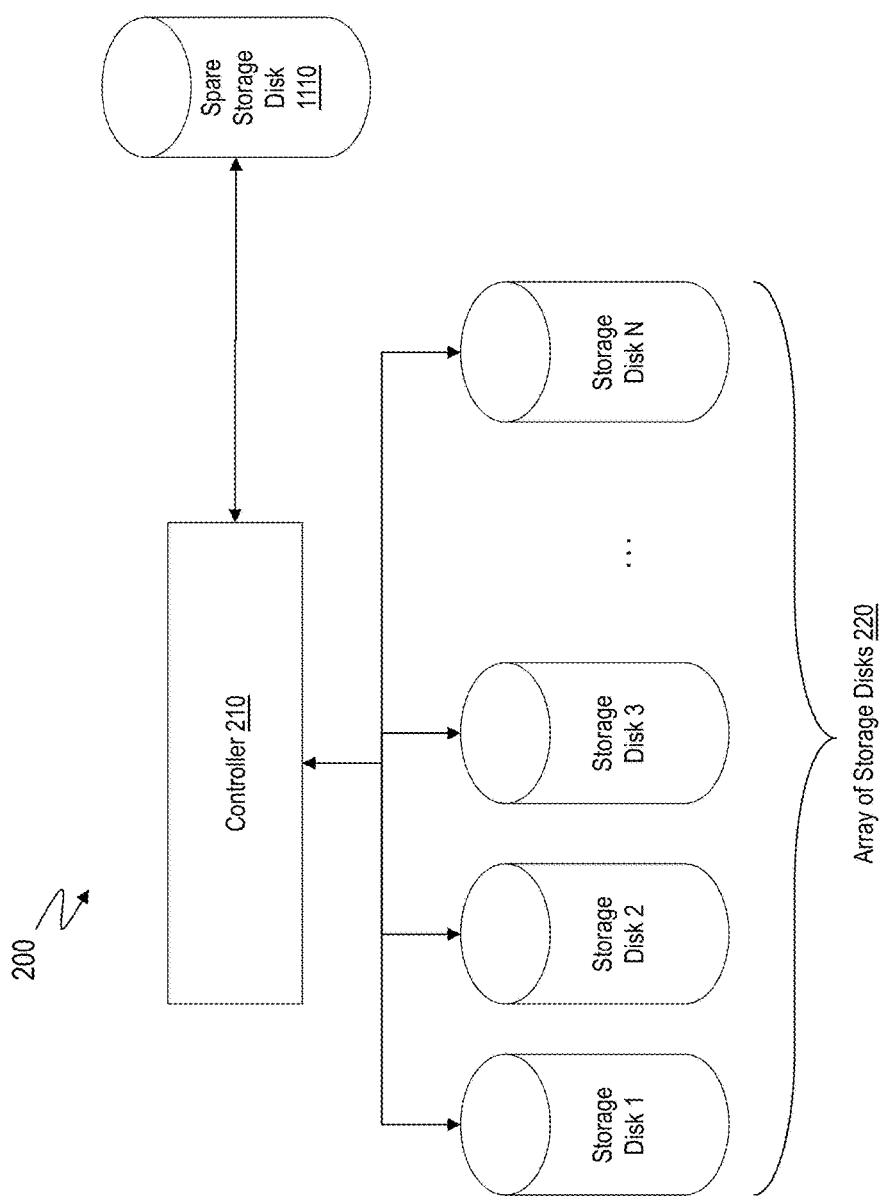
FIG. 11 illustrates an example storage system in accordance with an embodiment.

FIG. 11 illustrates the storage system 200 with a spare storage disk 1110 that in communication with the controller 210 like any other storage disk from the array of storage disks 220. The spare storage disk 1110 may be of the same type as any of the storage disks in the array 220, or alternatively of another type.

In an example, the maximum writes associated with wearout with the storage disks in the array 220 are varied across the storage disks in the array 220 without having to adjust the number of parity fields on each storage disk. Alternatively, the maximum writes are varied using the spare disk 1110 in conjunction with varying the parity fields on each storage disk in the array 220.

Embodiments of the present invention may be a system, a method, and/or a computer program product at any possible technical detail level of integration. The computer program product may include a computer readable storage medium (or media) having computer readable program instructions thereon for causing a processor to carry out aspects of embodiments of the present invention. Returning to the example system of 10 storage disks RAID array, the spare storage disk 1110 is an 11th storage disk. The description herein continues to use the exemplary characteristics of MTTF=260 weeks, and normal wearout distribution with first order sigma at 4 weeks.

Since in case of storage disk such as an SSD, the storage disk wears out when the maximum writes to the storage disk are exceeded, it is not a time to failure distribution. The estimated storage disk MTTF is not constant, but varies based on how many writes occur over time, which may vary. By tracking average writes per unit time interval a Time to Failure estimate is made and adjusted over time if the average writes per unit time interval varies due to changing application load. The technical solutions described herein facilitate a dynamic monitoring of average writes over time so that the a smaller time window to conduct the replacements is used to reduce replacing storage disks in the array 220 before most of the useful life of the storage disk has been exhausted. The technical solutions further provide a guided maintenance for replacing the storage disks in the array 220, such as SSDs in a RAID array.

Figure 12:
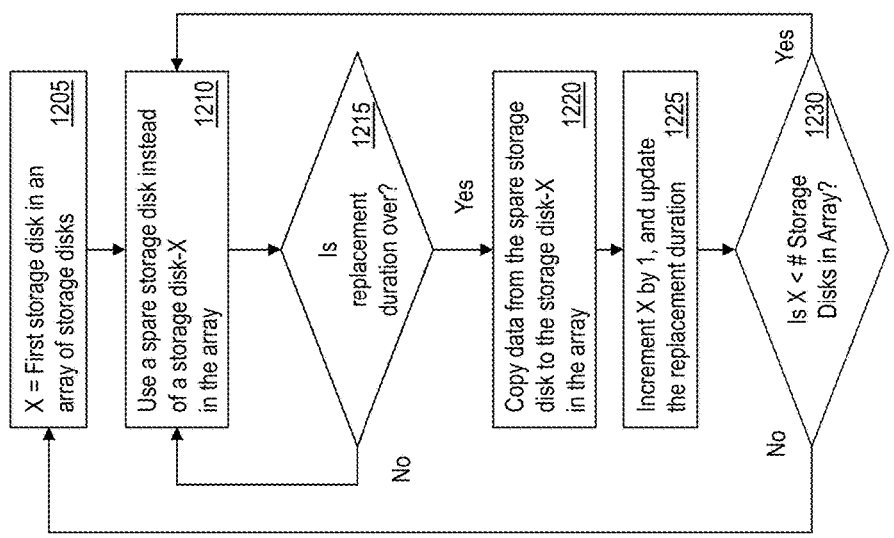
FIG. 12 illustrates a flowchart of example logic to use one or more replacement disks to reduce the occurrence of data loss in the storage system in accordance with an embodiment.

FIG. 12 is a flowchart of an example logic to shift the wearouts of the storage disks in the array 220 using the spare storage disk 1110. The example logic may be implemented by the controller 210 according to computer readable instructions that may be stored on a memory. The wearout shift process is initiated by using the spare storage disk 1110 to replace a first storage disk, as shown at block 1205 and 1210. The first storage disk may be any storage disk in the array. Replacing a storage disk in the array 220 by the spare storage disk 1110 entails the controller 210 redirecting a read/write operation that is directed to the storage disk to the spare storage disk 1110. Thus, for a write operation directed to the first storage disk, the controller 210 performs the write operation on the spare storage disk 1110, as long as the spare storage disk 1110 is replacing the first storage disk.

The spare storage disk 1110 replaces a storage disk in the array for a specific duration, as shown by block 1215. At the end of the replacement duration the controller 210 copies the data from the spare storage disk 1110 to the storage disk that was replaced, as shown at block 1220. The replacement duration is based on a predetermined deviation from the MTTF. For example, the predetermined deviation may be a first order, a second order or the like. Accordingly, the replacement duration may varies. The controller 210 subsequently uses the spare storage disk 1110 to replace a next storage disk in the array, as shown at block 1225. The controller 210, in an example updates the replacement duration for which the next storage disk is replaced by the spare storage disk 1110. For example, the replacement duration may be a multiple of the initial replacement duration, the multiplier corresponding to the iteration of the process. For example, the replacement duration for a second storage disk may be twice that of the first storage disk, the replacement duration for a third storage disk may be thrice that of the first storage disk, and so on. Other multiplying factors may be used to update the replacement duration. The controller 210 continues the process until all the storage disks in the array 220 are replaced in this manner after which, the controller 210 resets the replacement duration and the restarts the replacement process, as shown at block 1230.

Figure 13:
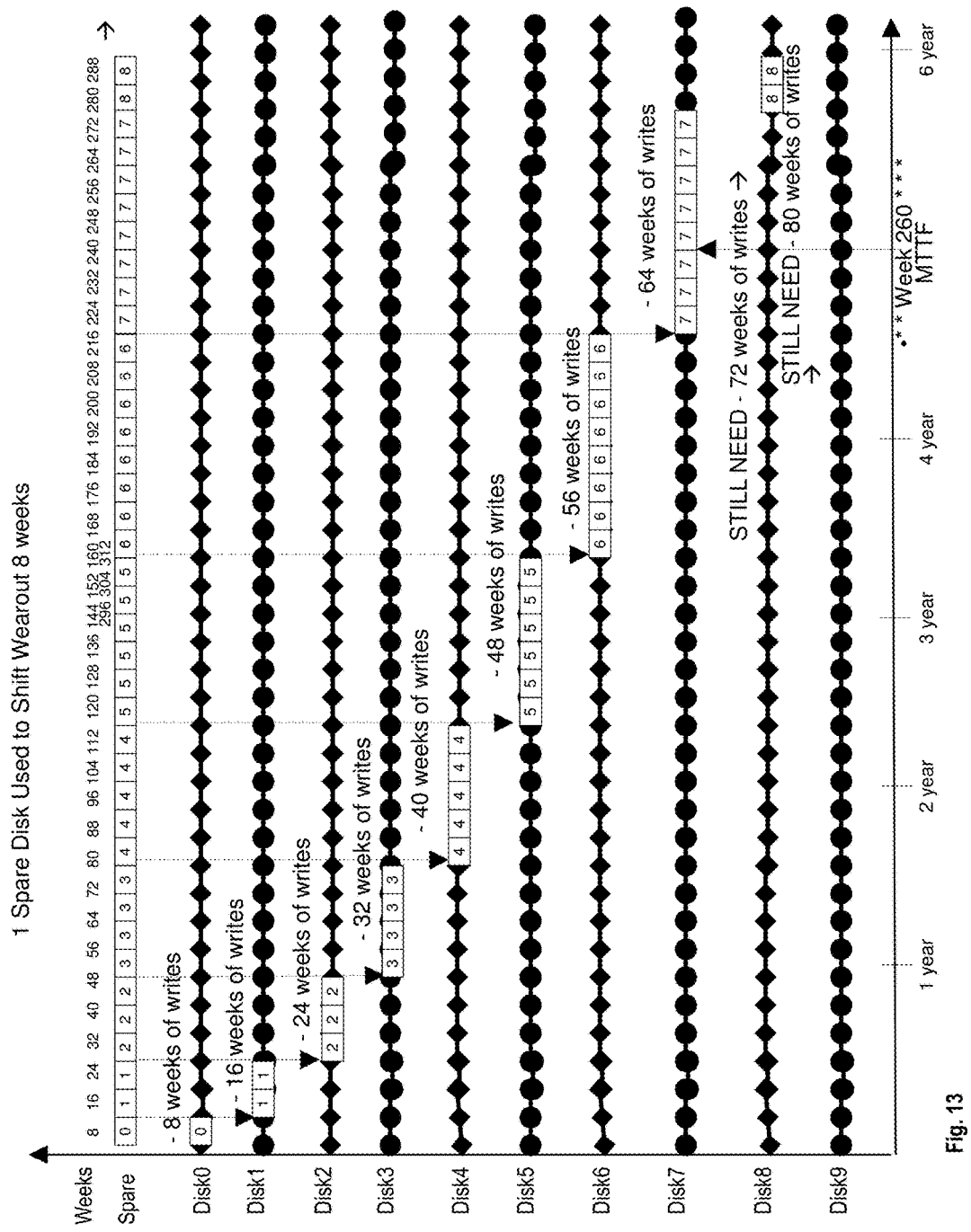
FIG. 13 illustrates an example schedule of using 1 spare disk to shift wearout 8 weeks in accordance with an embodiment.

FIG. 13 illustrates result of using the spare storage disk 1110 as described in the specific example of 10 storage disks, and using an initial replacement duration of 8 weeks (±4 weeks according to first order sigma). In the example, the controller 210 delays the wearout of the first storage disk by 8 weeks shifting the MTTF from week 260 to week 268. The controller 210, at the end of 8 weeks copies data from the spare storage disk 1110 back to the first storage disk and uses the first storage disk again. The controller 210 proceeds to copy data from a next storage disk to the spare storage disk 1110 and use the spare storage disk 1110 as the next storage disk for 16 weeks (replacement duration multiplied by iterator). This delays the wearout of a second storage disk by 16 weeks shifting the MTTF from week 260 to week 276. At the end of the $24^{th}$ week (16 weeks of replacement), the controller copies data from the spare storage disk 1110 to the second storage disk and begins using the second storage disk again. The results of continuing this process is illustrated in FIG. 13.

According to this example, shifting according to the ±4 week 1 sigma (8 week primary wearout window) and updating the replacement duration every iteration according to the iterator takes 440 weeks to complete for all the 10 storage disks. Since the MTTF is estimated at week 260, if the replacement process does not complete by the MTTF, the storage system 200 continues to experience storage disk failures clustered at week 260. As can be seen from FIG. 13, at week 260, the controller 210 has just begun to shift the wearout of storage disk-7 in the 10-disk array and not yet done anything with the storage disks 8 and 9. The total number of weeks to complete the wearout shifting with a single spare storage disk as described is determinable as $$\text{Total Weeks} = \sum_{i=1}^{N} (i \times W)$$

where N is the total number of storage disks in the array 220 and W is the initial replacement duration.

Figure 14:
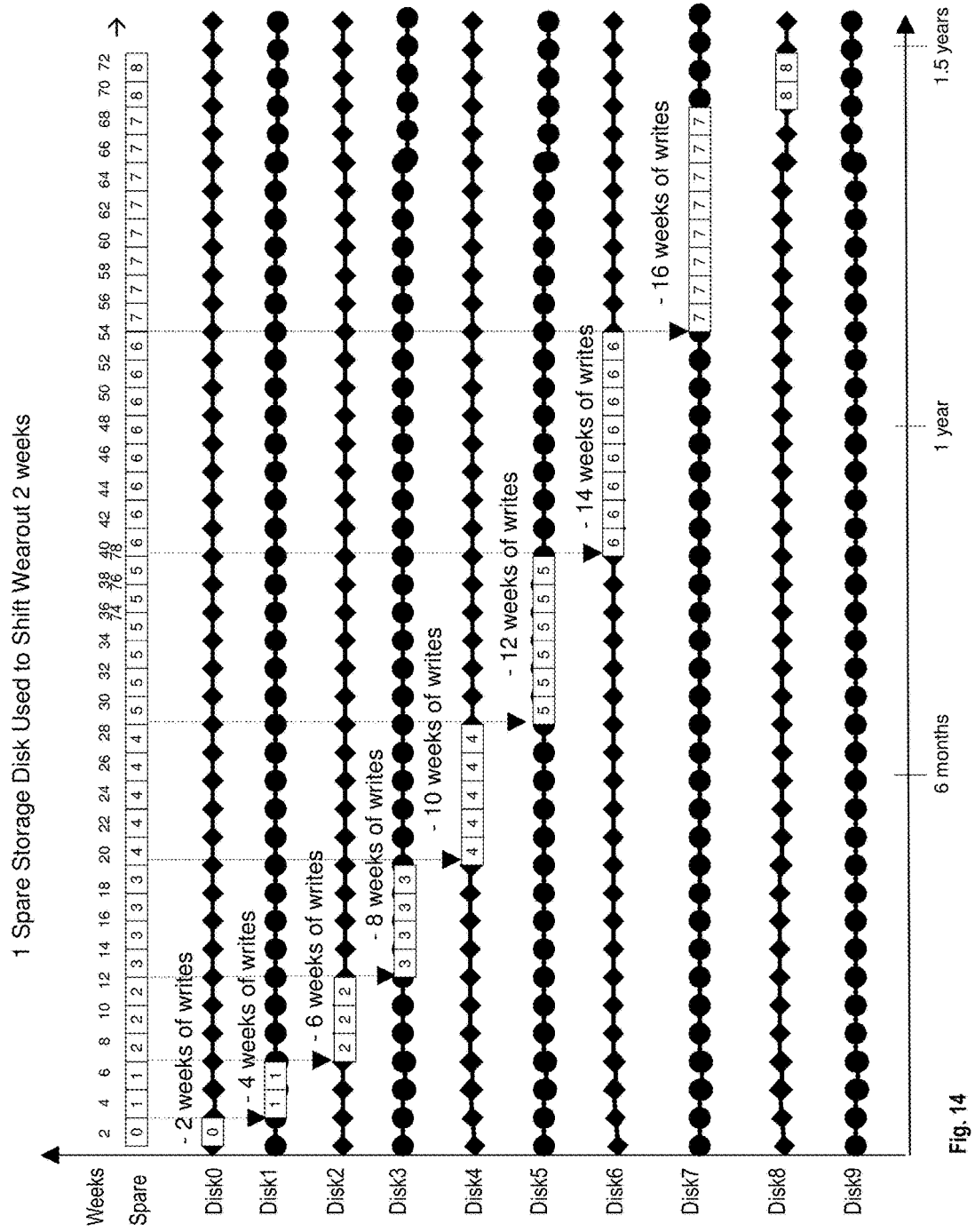
FIG. 14 illustrates an example schedule of using 1 spare disk to shift wearout 2 weeks in accordance with an embodiment.

Accordingly, in the specific example with N=10, and W=8, Total Weeks=440 weeks (~8.5 years). Since the MTTF for wearout, in the exemplary scenario is 5 years the controller 210 only completes the wearout shifting for 7 of the 10 storage disks. Accordingly, if the controller uses a different replacement period (W) and/or a different multiplier (i), the controller 210 may be able to complete the shifting of the wearout across all the storage disks. For example, instead of the full 8 weeks, the controller 210 may use a narrower wearout window, say the ±2 week 1 sigma (4 week wearout window) or the ±1 week 1 sigma (2 week wearout window). For example, using W=4, Total Weeks=220 weeks, which is less than the MTTF of 260 weeks. FIG. 14 illustrates an exemplary shifting schedule in such a case. Alternatively, the controller 210 may continue to use the replacement duration as 8 weeks in case the MTTF for wearout is greater than the resulting total weeks, say MTTF=9 years vs. 5 years or the number of SSDs in the storage array is less. Thus, the controller 210, or alternatively a user of the storage system 200 may configure the parameters of the replacement according to the MTTF, number of storage disks in the array 220, and the τ to be used to shift the wearout of the storage disks.

Figure 15:
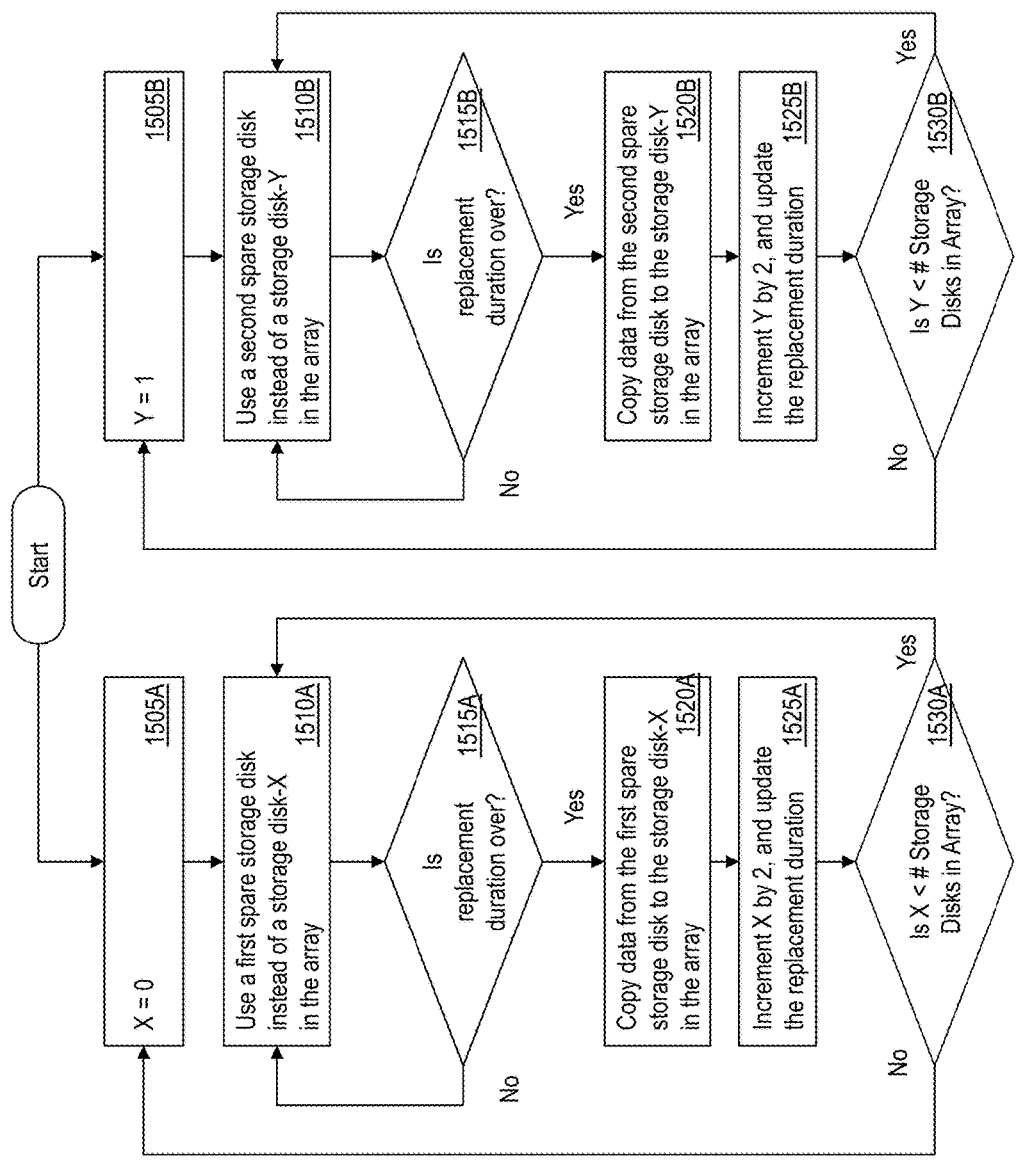
FIG. 15 illustrates a flowchart of example logic to use two replacement disks to reduce the occurrence of data loss in the storage system in accordance with an embodiment.

In another example, the storage system 200 uses a plurality of spare storage disks and continues to use the replacement duration according to the conservative larger wearout window. FIG. 15 illustrates an example logic for shifting the wearout using two spare storage disks. The replacement proceeds similar to the replacement using a single spare storage disk described herein, however, two storage disks in the array 220 are replaced by each of the spare storage disks respectively. For example, the controller 210 uses a first spare storage disk for replacing the even numbered storage disks and a second spare storage disk for replacing the odd numbered storage disks in the array 220.

For example, as shown in FIG. 15, the controller 210 initializes X=0 and uses the first spare storage disk to replace a storage disk-X in the array 220, as shown at 1505A and 1510A. The storage disk-X is replaced until the replacement duration expires, after which data from the first spare storage disk is copied back to the storage disk-X, as shown at blocks 1515A and 1520A. The controller 210 subsequently updates the X by incrementing it by 2 to replace the next even numbered storage disk, as shown at block 1525A. The controller 210 also updates the replacement duration corresponding to the next even numbered storage disk, as shown at 1525A. The controller 210 may continue this process for all the even numbered storage disks in the array 220, as shown at block 1530A.

Additionally, as shown in FIG. 15, the controller 210 initializes Y=1 and uses the second spare storage disk to replace a storage disk-Y in the array 220, as shown at 1505B and 1510B. The storage disk-Y is replaced until the replacement duration expires, after which data from the second spare storage disk is copied back to the storage disk-Y, as shown at blocks 1515B and 1520B. The controller 210 subsequently updates the iterator Y by incrementing it by 2 to replace the next odd numbered storage disk, as shown at block 1525B. The controller 210 also updates the replacement duration corresponding to the next odd numbered storage disk, as shown at 1525B. The controller 210 may continue this process for all the odd numbered storage disks in the array 220, as shown at block 1530B. The controller 210 may replace the even and the odd-numbered storage disks in parallel in an example.

Figure 16:
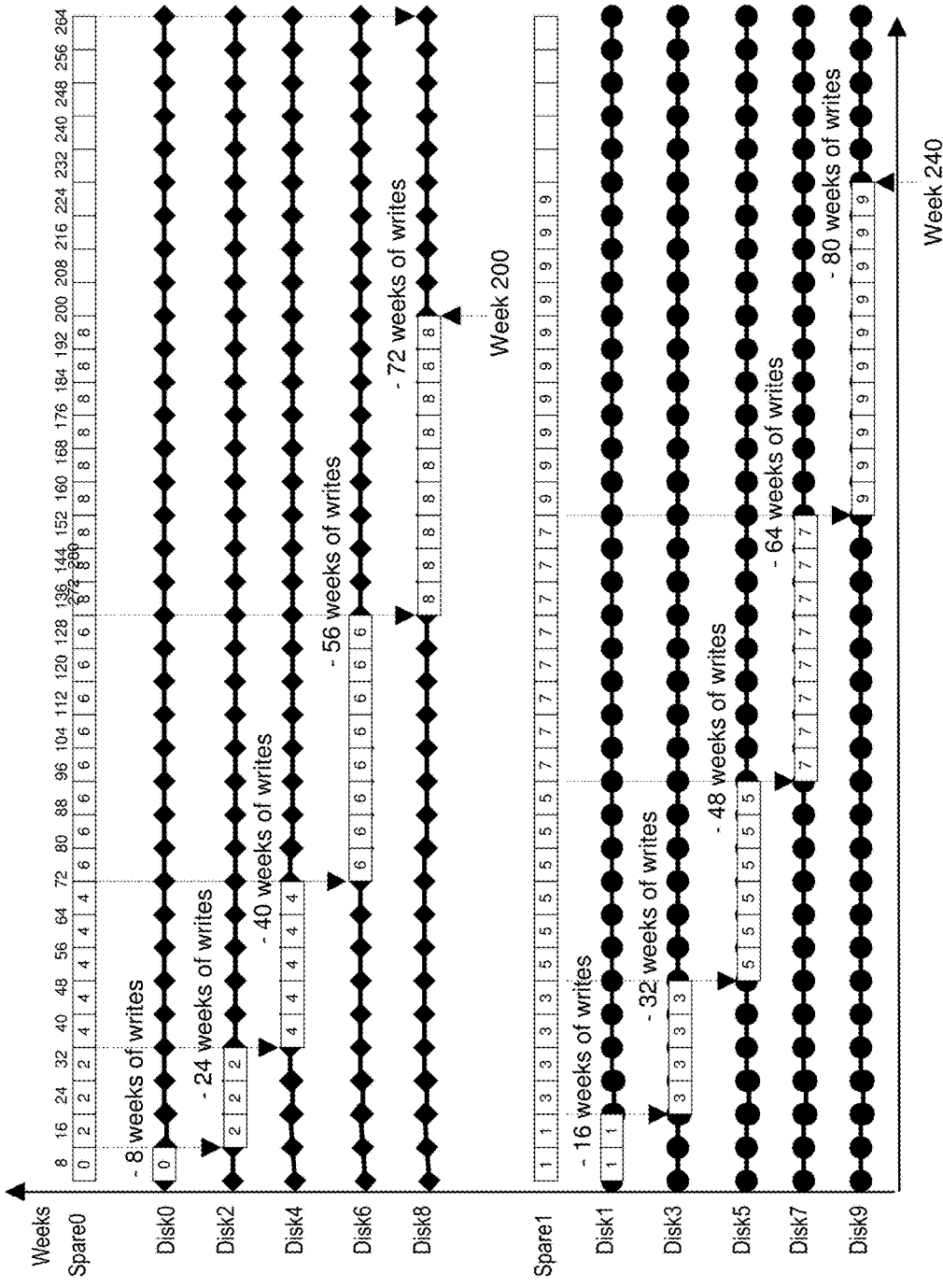
FIG. 16 illustrates an example schedule of using 2 spare disks to shift wearout in 8 weeks increments in accordance with an embodiment.

In the previous exemplary scenario with 10-storage disk array with MTTF=260 weeks, and σ=±4 weeks, the two spare storage disks proceeds as described further. FIG. 16 illustrates a schedule of the wearout shifting in such case. Referring to the FIG. 16, the controller 210 starts the wearout shift process by running the SPARE0 instead of storage disk-0 for the first 8 weeks and then copy the data from the SPARE0 to the storage disk-0 at that time. This delays the wearout of the storage disk-0 by 8 weeks shifting the MTTF from week 260 to week 268. The controller additionally uses SPARE1 instead of storage disk-1 for the first 16 weeks and then copies the data from the SPARE1 to storage disk-1 at that time. This delays the wearout of the storage disk-1 by 16 weeks shifting the MTTF from week 260 to week 276. At the end of the first 8 weeks the controller 210 copies data from the SPARE0 to the storage disk-0 and begins using the storage disk-0 again. The controller 210, at this time, copies the data from storage disk-2 to the SPARE0 and use the SPARE0 as the storage disk-2 for 24 weeks. This delays the wearout of the storage disk-2 by 24 weeks shifting the MTTF from week 260 to week 284. The controller 210 then copies data from the SPARE0 to storage disk-2 and begins using storage disk-2 again. The controller 210 continues this process for the even numbered storage disks, storage disk-4, storage disk-6, and storage disk-8. The odd numbered storage disks are handled in a similar manner.

The total weeks to complete the wearout time shift for the odd number and even number storage disks in the array can be calculated as follows.

Total Weeks=Max(Total Weeks Odd, Total Weeks Even), where $$\text{Total Weeks Odd} = \sum_{i=1, i\,odd}^{N-1} (i \times W)$$

$$\text{Total Weeks Even} = \sum_{i=0, i\,even}^{N} (i \times W)$$

W=Initial Replacement Duration, and
N=Total Number of Storage Disks

Accordingly, in the exemplary scenario, with N=10 and W=8, Total Weeks Odd=200 weeks, and Total Weeks Even=240 weeks. Thus, Total Weeks=240 weeks. Hence, with two spare storage disks the controller successfully shifts the wearout across the 10 storage disks by week 240, which is 20 weeks prior to the MTTF of 260 weeks for wearout.

Figure 17:
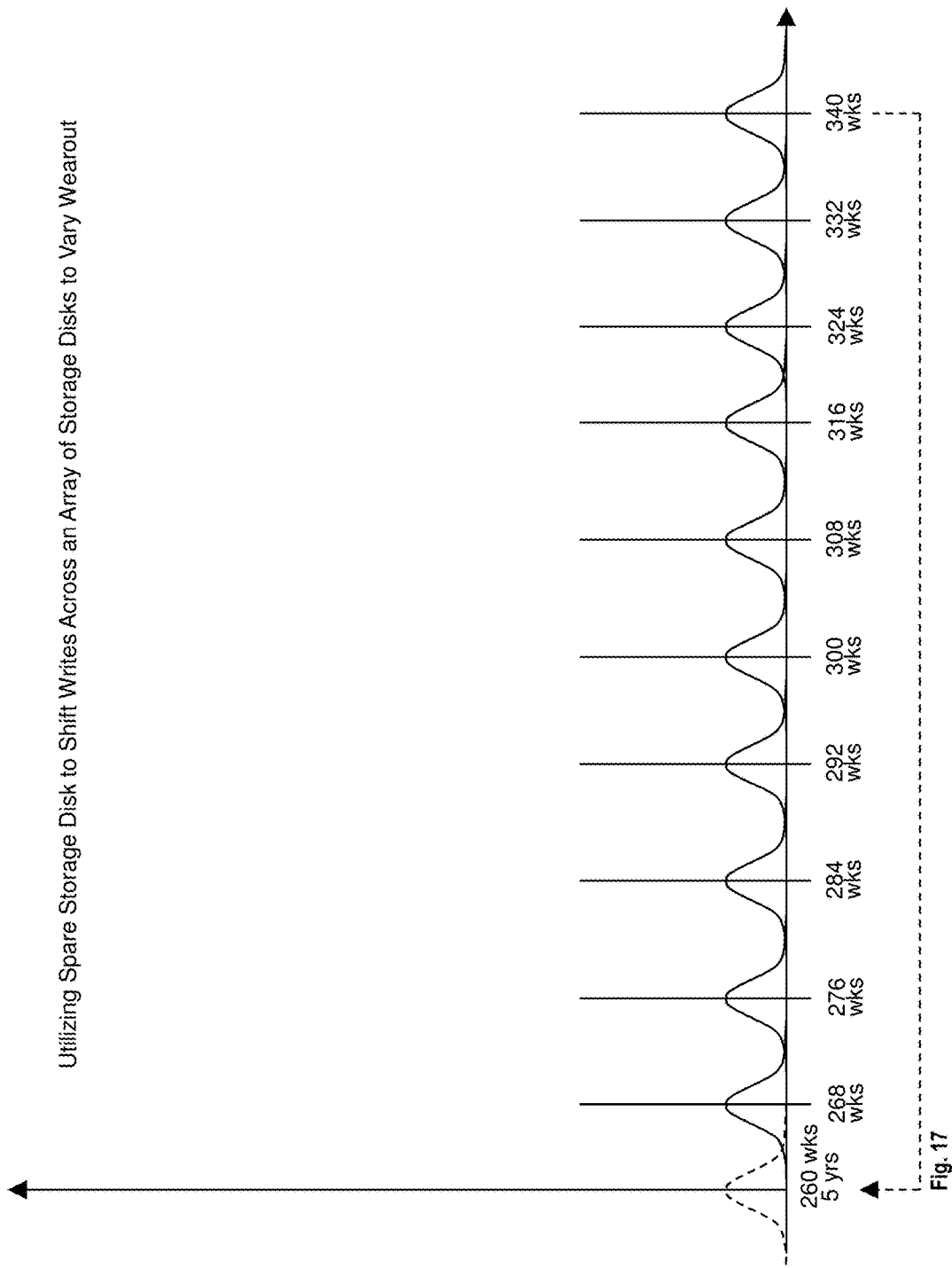
FIG. 17 illustrates an example schedule of utilizing spare storage disk to shift writes across an array of storage disks to vary wearout in accordance with an embodiment.

FIG. 17 shows the MTTF shift for each storage disk once the shifting process completes. In an example, the controller may not shift the wearout for the last storage disk, which takes the longest to shift. In the specific scenario, the controller 210 skips the wearout shifting of storage disk-9, since it is the only one that still has its MTTF at week 260. Skipping the shifting for the last storage disk reduces the total weeks of the shifting process. For example, in the 10-disk scenario if storage disk-9 is not shifting, the time to complete the shifting is reduced from 240 to 200 weeks. Skipping the shifting of the last disk in the example with a single spare storage disk reduces the time from 440 weeks to 360 weeks (~8.5 years to ~6.9 years).

In addition to shifting the wearout across the storage disks in the array, the technical solutions described herein prevent storage disks being replaced prematurely, but only when the full write limit of each storage disk has been reached.

The technical solutions described herein may be deployed as a software or firmware for the controller 210 of the storage system 200 that has already been deployed. In other words if a storage systems has been shipped 2 years earlier, a computer product comprising computer readable instructions, or alternatively a replacement controller may be added to the system to prevent cluster wearout failure of the storage disks.

The technical solutions described herein thus facilitate a storage system to prevent data loss for storage disks that tend to all fail at about the same time by reducing probability of encountering a secondary storage disk failure (and hence data loss) before a first failed storage disk can be replaced and reintegrated back into an array of the storage system, such as a RAID array. The technical solution reduces the probability of the data loss by replacing storage disks in the array sequentially. The storage disks may be replaced individually at different times, or in parallel. Replacing the disk varies the number of writes across the storage disks in the array, and hence shifts the wearout of the storage disks. Thus, the technical solutions described herein vary the writes across the storage disks through the use of a spare storage device that systematically temporarily replaces each storage device in the array for differing amounts of time. The differing amounts of time spreads the wearout window for the storage disks over different periods of time.

Disk Replacement Notification

According to yet another embodiment, the technical solutions facilitate monitoring and tracking a number of writes to the storage disks and the rate of writes to the storage disks in the array 220. As the maximum write limit for storage disk(s) in the array 220 draws nearer, the controller 210 may generate and trigger an alert so that an administrator arranges for replacement(s) can be made prior to reaching wearout for the storage disks in the array 220. For example, the controller 210 may generate the alert would indicating that a first storage disk in the array 220 is to be replaced. Once that repair is complete the controller 210 generates a second alert, after passage of a predetermined time, for a second storage disk in the array 220. The controller 210 may continue to generate periodic alerts in this manner over an extended period. The technical solutions described herein, further facilitate triggering an alert prior to the wearout period of a storage disk so that the storage disk can be replaced before the probability of encountering a second device failure during the repair and rebuild increases substantially. Additional consideration is provided so that the storage disk is not replaced grossly prematurely, before the wearout of the storage disk.

In addition, the technical solutions described herein facilitate an improvement of rebuilding and replacing a storage disk that is close to wearout. For example, if the administrator replaces a storage device in response to the alert, the rebuild of the data from the storage disk that is to be replaced to a new replacement disk includes reading the data from the storage disk and writing the data to the replacement disk. The controller 210 permits reading data from the storage disk even if the write limit of the storage disk has been reached. Thus, the replacement disk is installed without performing a data rebuild, which is generally performed when replacing an already failed disk. The data rebuild generally includes, reading data from all the storage disks in the array 220 and generating the data from the failed storage disk, such as by using an XOR operation of the data and parity together to reproduce data from the failed storage disk.

In another example, the controller 210 monitors the number of writes and the rate of writes over time to the storage disks in the array 220. As the maximum write limit for a first storage device draws nearer, the controller triggers an alert indicative to replace all the storage disks in the array 220 prior to reaching wearout for the first storage disk. The controller may generate such an alert closer to an expected wearout of the first storage disk, compared to the alert in the earlier example because the delay between replacing the storage disks in this manner would be lesser than replacing the storage disks sequentially. For example, the administrator replaces the first storage disk immediately followed by the next, and so on until all the storage disks in the array 220 are replaced. Additionally, the alert in this manner facilitates the administrator to order all the replacement storage disks in the array at the same time and replacements are done as a single set of serial events. Thus, repeated repair actions to the system are reduced, which in turn save time and costs, especially if there is travel involved for the administrator (or a technician) to replace the storage disks.

Typically, the storage system 200 initiates a Predictive Failure Alert (PFA) upon detecting wearout of one of the storage disks in the array 220 of the storage system 200. The technical solutions facilitate the controller to provide a notification earlier than, and distinct to, the PFA so that a first storage disk is replaced before the wearout period for the first storage disk in the array 220 is reached. Thus, the probability of encountering a secondary storage disk failure before the first storage disk is replaced and reintegrated back into the array 220 is reduced. Accordingly, the storage disks in the array 220 remain in use for the vast majority of their useful life. The notification is generated before wearout, before the storage disks reach the point where a secondary storage disks failure are likely to occur. As a result, some amount of useful life of the storage disks is lost.

The storage system issues a first alert to replace storage disk(s) in the array 220 according to the expression
$T_{start} = N \times [T_{repair} + T_{wait}] + T_{1\text{-}sigma}$;
where, $T_{start}$=Time prior to MTTF when the first alert is issued;
$T_{repair}$=Time to detect the storage disk failure, procure a replacement storage disk, replace the storage disk & rebuild data so as to integrate the replacement storage disk into the array 220 ($T_{repair} = T_{detect} + T_{order} + T_{replace} + T_{rebuild}$);
$T_{wait}$=Time to wait prior to generating a subsequent alert;
$T_{1\text{-}sigma}$=Time that is first order σ from the MTTF; and
N=Number of storage disks in the array.

For example, with respect to the exemplary RAID-5 system described herein, which has 10 storage disks with a MTTF of 260 weeks (that is 5 device years), the system will generate and issue a first alert as described below. As a reminder, in the example system being considered, the $T_{repair}$=1 week, the $T_{wait}$=1 week; the $T_{1\text{-}sigma}$=4 weeks; and N=10. Thus, considering that repairing a storage disk takes up to a week and 68% of the wearout is expect to occur in an 8 week window centered around an MTTF of 5 device years (260 weeks), the system determines when to generate and issue a first alert.

Accordingly, $$T_{start} = N \times [T_{repair} + T_{wait}] + T_{1\text{-}sigma}$$
$$= 10 \times [1 \text{ week} + 1 \text{ week}] + 4 \text{ weeks}$$
$$= 24 \text{ weeks}.$$

Thus, the exemplary storage system generates and issues a first alert 24 weeks prior to MTTF, that is at week 236 (260-24). Accordingly, at week 236 the notification indicating that a first storage disk in the array is to be replaced. The storage system 200 may automatically order a replacement disk in response to the notification. Alternatively, a system administrator orders the replacement disk. Consider that the first storage disk is replaced by the replacement disk within a week. The system then waits for 1 week ($T_{wait}$), after the replacement is complete, before issuing a next alert indicating that a second storage disk in the array needs to be replaced. Thus, in the exemplary scenario the second notification is generated and issued 22 weeks before the 5 year MTTF point. Accordingly, in this example, the $2^{nd}$ replacement completes at 20 weeks prior to MTTF, the $3^{rd}$ replacement at 18 weeks prior to MTTF and so on as listed in Table 1.

TABLE 1

| Storage Disk | Weeks Prior to MTTF | Weeks from Time Zero | % Premature |
|---|---|---|---|
| 0 | 24 | 236 | 9.23 |
| 1 | 22 | 238 | 8.46 |
| 2 | 20 | 240 | 7.69 |
| 3 | 18 | 242 | 6.92 |
| 4 | 16 | 244 | 6.15 |
| 5 | 14 | 246 | 5.38 |
| 6 | 12 | 248 | 4.62 |
| 7 | 10 | 250 | 3.85 |
| 8 | 8 | 252 | 3.08 |
| 9 | 6 | 254 | 2.31 |
| | | | 5.77 average |

Figure 18:
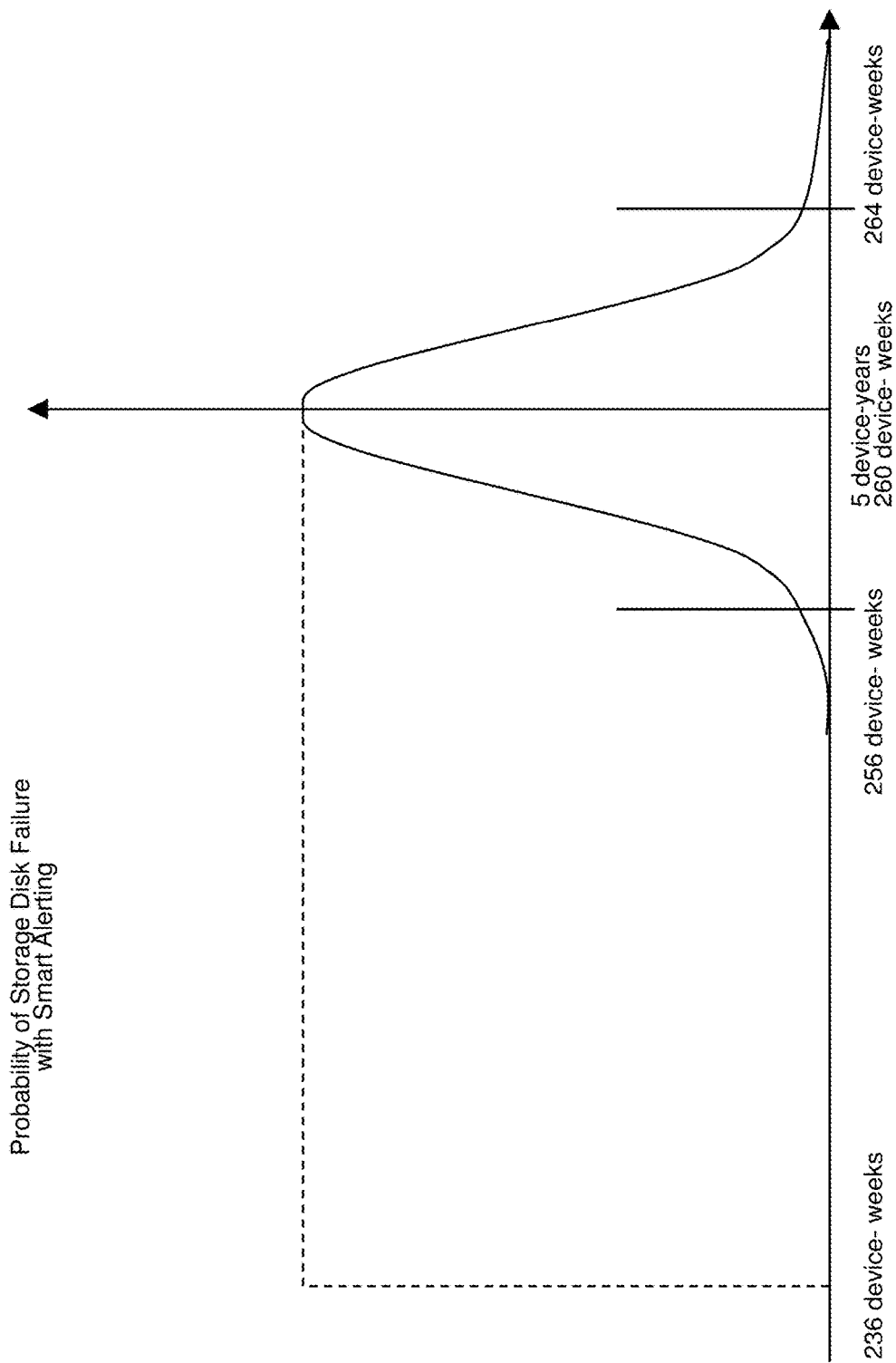
FIG. 18 illustrates example probability of storage disk failure with prior alerting.

Referring to FIG. 18, the storage system 200, in this exemplary scenario, initiates the notification to replace storage disk(s) in the array 220, starting 24 weeks before the 5 year MTTF, as illustrated by the dashed line illustrated. This start time of 24 weeks is determined by considering the number of storage devices in the array 220, the repair time, and the delay time. For example, the storage system 200 issues a first alert at [(1+1)×10] weeks prior to the 4 week−1 (minus 1) sigma point on the distribution since there are 10 drives in the array, up to 1 week repair time, and 1 week delay before generating the next alert. As illustrated in Table 1, this schedule facilitates the system to replace all the storage disks in the array before the wearout period is reached. The replacement of all the storage disks, as illustrated, is completed before the 4 week−1 sigma point (260−6=256 weeks), that is prior to the 5 year MTTF. In addition, as each subsequent storage disk is replaced, the probability of a wearout of any of the remaining drives in the array that have yet to be replaced is reduced. Thus, the system allays the storage disk data loss because of wearout associated with a recovery scheme, such as RAID-5. The tradeoff, in this particular example, is a 5.77% loss of useful life time of the storage disks on average (see table 1).

The storage system 200, for example via the controller 210, utilizes smart data information from the storage disks along with data tracked by the controller 210 itself to determine rate of the array approaching a wearout. Since the wearout with storage disks, such as SSDs, is associated with a number of writes, the wearout of a storage system 200 is application environment dependent. Hence, the MTTF is dynamic. The controller 210, by monitoring the rate of writes to the storage disks in the array 220, determines an accurate estimate of the MTTF for the particular storage system 200. For example, the controller 210 determines a dynamic estimate of the MTTF by considering not just the total writes to the storage disks over time, but the rate of change of writes over time so that the estimated MTTF can be adjusted along with the 1 sigma point of the wearout distribution.

In yet another example, the storage system generates and issues a notification signaling that all the storage disks in the array 220 are to be replaced so that replacement disks for all the storage disks are ordered at one time. This facilitates the storage system to issue the notification later than a notification time in case of sequential replacement as described elsewhere in this document. Thus, the storage system 200 reduces the duration of time prior to reaching MTTF for the alert to be generated, and consequently reduces loss of useful life of the storage disks. For example, the alert to replace all the storage disks may be generated at a time $T_{start\text{-}all}$, determined as:

$$T_{start\text{-}all} = T_{detect} + T_{order}[N \times [T_{replace} + T_{rebuild} + T_{wait}]] T_{1\text{-}sigma}$$

In the exemplary RAID-5 scenario, $T_{start\text{-}all}$, determined according to the above considerations, is—

$$T_{start\text{-}all} = 1 \text{ day} + 1 \text{ week} + [10 \times [1 \text{ hour} + 1 \text{ hour} + 22 \text{ hours}]] + 4 \text{ weeks}$$
$$= 8 \text{ days} + [\sim 1 \text{ day}] + 28 \text{ days}$$
$$= \sim 37 \text{ days}(5\text{-}6 \text{ weeks}).$$

Here, it is assumed that detection of a wearout takes 1 day, ordering the replacement disks takes 1 week, replacing the disk takes 1 hour, rebuilding the data takes another 1 hour, and that the storage system replaces a subsequent storage disk at least one day after testing the current replacement for almost a day.

Figure 19:
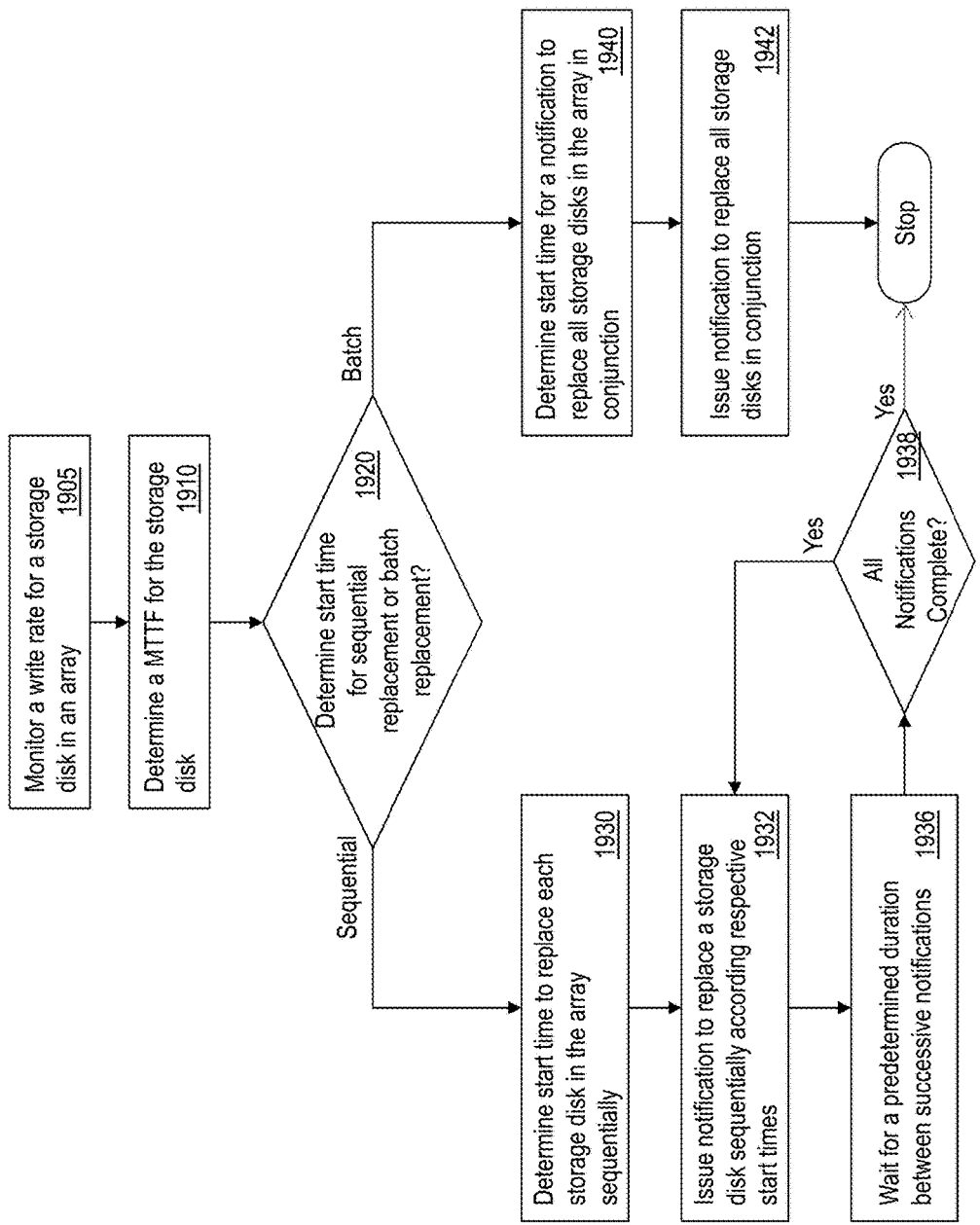
FIG. 19 illustrates a flowchart of example logic to determine alert times to reduce the occurrence of data loss in the storage system in accordance with an embodiment.

FIG. 19 illustrates a flowchart of example logic to forestall data loss in the storage system 200, particularly data loss that is caused by a secondary wearout while a first storage disk of the array is being replaced due to wearout of the first storage disk. In an example, the controller 210 implements the logic, which may be part of a computer program product that contains computer executable instructions. According to the logic, the controller 210 monitors the rate of writes for the storage disks in the array 220, as shown at block 1905. In an example, the controller 210 monitors the rate of writes for each storage disk separately. In another example, the controller 210 monitors the rate of writes for selected storage disks in the array and determines a rate of write for the overall array, such as by averaging the monitored rate of writes. The controller 210 determines the MTTF for a storage disk in the array based on the monitored rate of writes, as shown at 1915. For example, the storage devices may have a predetermined maximum number of writes. The maximum number of writes may be predetermined by a manufacturer of the storage disk, or alternatively may be predetermined by the controller 210. In an example, the controller 210 prohibits any writes to a storage disk that has encountered the maximum number of writes. The controller 210 may permit reading data from the storage disk that has encountered the maximum number of writes. The controller 210 determines the MTTF for the storage disk based on the maximum number of writes and the rate of writes.

The controller 210 may be configured to forestall the data loss by replacing the storage disks in the array sequentially or by replacing all the storage disks in the array in conjunction. In another example, the controller 210 may be configured to replace the storage disks in the array in smaller batches of predetermined sizes. The flowchart illustrates the cases in which all the storage disks are replaced in a single batch or all the storage disks are replaced in multiple batches of 1 disk each. The controller 210 determines which is the case, as shown at block 1920. In case the controller 210 is configured to replace all the storage disks in conjunction, the controller 210 determines a start time to issue a notification for replacement of all the storage disks, as shown at 1940. For example, the start time may be determined as $T_{start-all}$ as described herein. The controller 210 issues the notification to replace all the storage disks in the array at the determined start time, as shown at block 1942. The controller 210, in an example, may issue an order for the number of replacement disks in the array 220 (not shown). In another example, in response to the notification, the administrator of the storage system may place the order and initiate replacement of the storage disks once the replacement disks are procured.

In case the controller 210 is configured to replace the storage disks sequentially, the controller 210 determines the start time to issue the notification to replace each storage disk in the array, as shown at block 1930. The controller 210, in an example, may generate the start time corresponding to each storage disk sequentially, that is the controller 210 determines a first start time for replacement of a first storage disk and after completion of replacement of the first storage disk, the controller determines a second start time for a second storage disk, and so on. Alternatively, the controller 210 generates a schedule that includes all the start times for each of the storage disk in the array 220. At the start time for each respective storage disk in the array 220, the controller 210 issues a notification to replace the respective storage disk, as shown at 1932. The controller 210 waits for a predetermined duration ($T_{wait}$) until it issues a subsequent notification for replacement of a next storage disk in that array 220, as shown at block 1936. If all notifications are complete the controller 210 ends the notifications for the time being, and may resume monitoring the rate of writes to iteratively continue the entire process, as shown at block 1938. Alternatively, if all the storage disks in the array 220 have not yet been replaced, the controller 210 continues to issue the notifications, as shown at 1932.

Since the wearout of a storage disk, such as SSD, occurs when the maximum writes to the storage disk are exceeded, the distribution of replacing the storage disks in the array is not modeled as a time to failure distribution. The estimated storage disk MTTF is not constant, but varies based on how many writes occur over time which may vary. By tracking average writes per unit time interval a MTTF estimate is made and adjusted over time if the average writes per unit time interval varies due to changing application load. Thus, the storage system 200 provides dynamic monitoring of average writes over time so that the a smaller time window is used to place the storage disks before most of their useful life has been exhausted by providing guided maintenance for replacing the storage disks in the array 220. Such a guided maintenance may be deployed as a computer product that contains control instructions for the controller 210 of the storage system 200 that has already been deployed.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for shifting wearout of storage disks in an array of storage disks in a storage system, the method comprising:
   staggering, by a controller of the storage system, completion of a maximum number of writes for each storage disk in the array, the staggering including:
      copying, by a controller of the storage system, data from a first storage disk in the array to a replacement disk;
      redirecting, by the controller, a first request to access the data from the first storage disk to the replacement disk;
      in response to passage of a first predetermined duration of time since copying the data from the first storage disk to the replacement disk, copying, by the controller, the data from the replacement disk to the first storage disk and directing the first request to access the data from the first storage disk back to the first storage disk;
      copying, by the controller of the storage system, data from a second storage disk in the array to the replacement disk;
      redirecting, by the controller, a second request to access the data from the second storage disk to the replacement disk; and
      in response to passage of a second predetermined duration of time since copying the data from the second storage disk to the replacement disk, copying, by the controller, the data from the replacement disk to the second storage disk and directing the second request to access the data from the second storage disk back to the second storage disk, the first predetermined duration and the second predetermined duration are distinct, and the first and the second durations are based on a number of storage disks in the array, and a mean time to failure of the storage disks in the array.

2. The method of claim 1, wherein the replacement disk comprises a plurality of replacement disks.

3. The method of claim 2, wherein the data from the first storage disk is copied to a first replacement disk from the plurality of replacement disks, and the data from the second storage disk is copied to a second replacement disk from the plurality of replacement disks.

4. The method of claim 3, wherein the data from the first storage disk is copied to the first replacement disk in parallel to copying the data from the second storage disk to the second replacement disk.

5. The method of claim 4, further comprising:
   in response to completion of copying data from the first replacement disk to the first storage disk:
      copying, by the controller, data from a third storage disk of the array to the first replacement disk;
      redirecting, by the controller, a third request to access the data from the third storage disk to the first replacement disk; and
      in response to passage of a third predetermined duration of time since copying the data from the third storage disk to the first replacement disk, copying, by the controller, the data from the first replacement disk to the third storage disk and directing the third request to access the data from the third storage disk back to the third storage disk.

6. The method of claim 1, wherein a storage disk in the array is one of a solid state drive, a flash memory, or a flash dual in-line memory module (DIMM), interfaced using a peripheral component interconnect (PCI) card or a serial attached small computer system interface (SAS).

7. The method of claim 6, wherein the array of storage disks is maintained as a redundant array of independent disks (RAID).

\* \* \* \* \*